United States Patent
Masaki

(10) Patent No.: US 7,317,551 B2
(45) Date of Patent: Jan. 8, 2008

(54) METHOD AND APPARATUS FOR TAB SHEET PRINTING

(75) Inventor: Kazunori Masaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 10/358,236

(22) Filed: Feb. 5, 2003

(65) Prior Publication Data

US 2003/0164980 A1 Sep. 4, 2003

(30) Foreign Application Priority Data

Feb. 6, 2002 (JP) ............................. 2002-029580
Jan. 9, 2003 (JP) ............................. 2003-003614

(51) Int. Cl.
*G06F 15/00* (2006.01)

(52) U.S. Cl. ..................... 358/1.18; 715/517

(58) Field of Classification Search .............. 358/1.15, 358/1.18, 1.12, 1.1; 715/517, 518, 527; 399/382
See application file for complete search history.

(56) References Cited

U.S. PATENT DOCUMENTS

| | | | | |
|---|---|---|---|---|
| 5,210,622 A | * | 5/1993 | Kelley et al. | 358/451 |
| 5,337,161 A | * | 8/1994 | Hube | 358/448 |
| 5,519,501 A | * | 5/1996 | Hamilton | 358/296 |
| 6,549,300 B2 | * | 4/2003 | Motamed et al. | 358/1.18 |
| 6,571,072 B1 | * | 5/2003 | Sugimoto | 399/81 |
| 6,758,471 B2 | * | 7/2004 | Hirako | 271/258.01 |
| 6,828,990 B2 | * | 12/2004 | Krolczyk et al. | 715/777 |
| 2002/0051206 A1 | | 5/2002 | Masaki | 358/1.18 |
| 2002/0180822 A1 | * | 12/2002 | Aritomi | 347/19 |

\* cited by examiner

*Primary Examiner*—Kimberly A. Williams
(74) *Attorney, Agent, or Firm*—Fitzpatrick, Cella, Harper & Scinto

(57) ABSTRACT

There are provided a printing control apparatus and printing system which can accurately print index information on the tab portion of a tab sheet without any print offset. A position where index information (Section 1-Section 5) is to be printed on each tab portion of a tab sheet set (300) (constituted by, e.g., five sheets) is set first. Index information is then printed in advance on a test printing sheet (310) (opaque sheet), together with boundary lines (L1-L3) indicating a print area, on the basis of the setting value. When a print offset amount in the horizontal direction is to be measured, a boundary line (L2) of the test printing sheet (310) is superimposed on the right end (iii) of an index area of the tab sheet set (300), and the distance (print offset amount) between an extension line (ii) of the boundary line (L2) and the left end (i) of the index area is measured. The index information (Section 1-Section 5) can be properly printed on the tab sheet set (300) upon resetting of the setting values by using the measurement value.

24 Claims, 33 Drawing Sheets

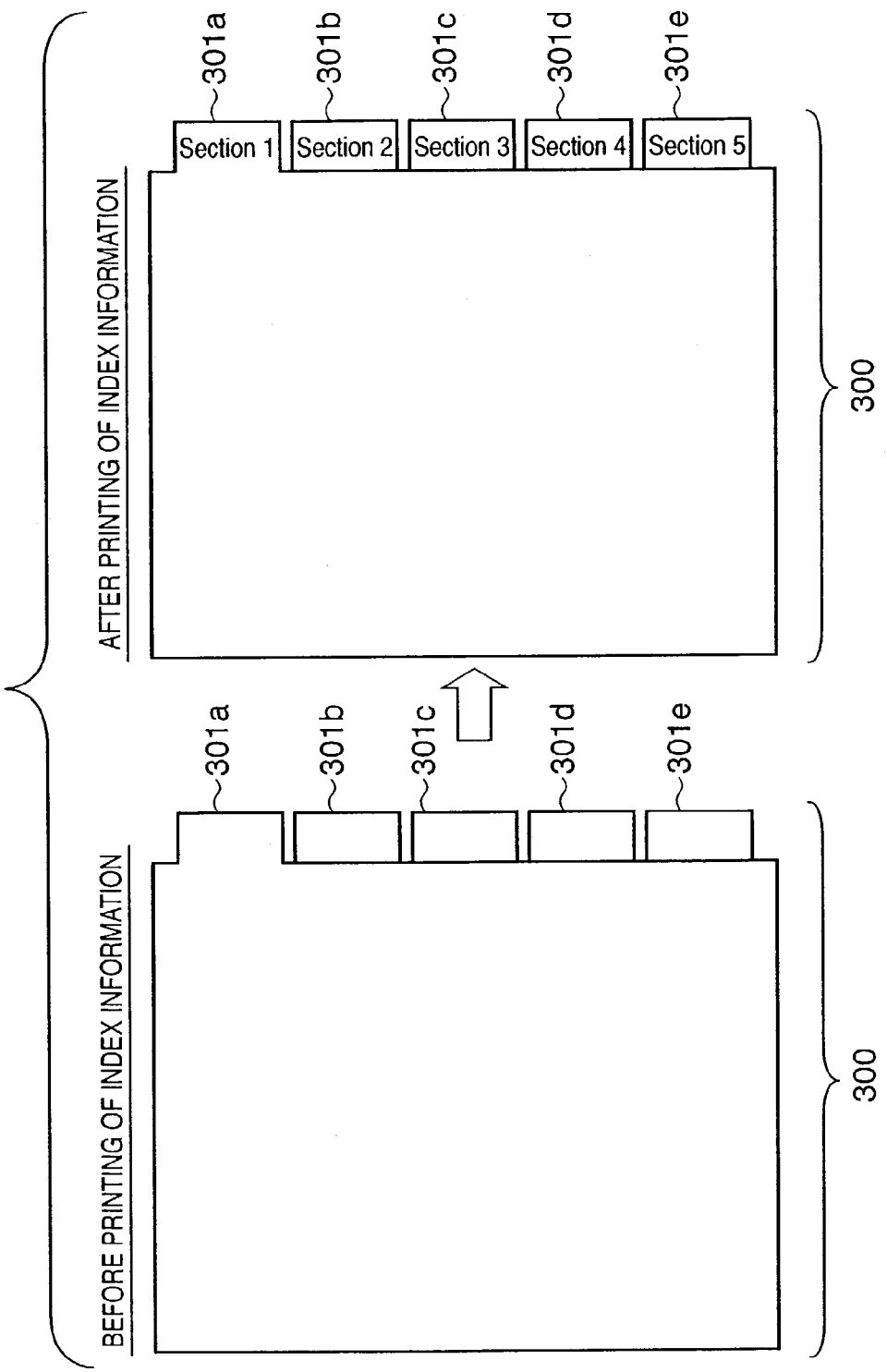

FIG. 13B

| HORIZONTAL DETAILED PRINT POSITION ADJUSTMENT |
| --- |
| (1) SUPERIMPOSING RIGHT END (iii) OF INDEX AREA OF TAB SHEET SET ON UPPER BOUNDARY LINE (L2) OF INDEX AREA PRINTED ON TEST PRINTING SHEET |
| (2) PERFORMING EYE MEASUREMENT OF HORIZONTAL OFFSET WIDTH ($\Delta L$) BY COMPARING LEFT END (i) OF INDEX AREA OF TAB SHEET SET WITH LEFT BOUNDARY LINE (L3) OF INDEX AREA PRINTED ON TEST PRINTING SHEET |

FIG. 14B

| VERTICAL DETAILED PRINT POSITION ADJUSTMENT |
|---|
| (1) SUPERIMPOSING LEFT END (i) OF INDEX AREA OF TAB SHEET SET ON LEFT BOUNDARY LINE (L3) OF INDEX AREA PRINTED ON TEST PRINTING SHEET |
| (2) PERFORMING EYE MEASUREMENT OF VERTICAL OFFSET WIDTH (ΔL) BY COMPARING UPPER END (iv) OF INDEX AREA OF TAB SHEET SET WITH UPPER BOUNDARY LINE (L1) OF INDEX AREA PRINTED ON TEST PRINTING SHEET |

METHOD AND APPARATUS FOR TAB SHEET PRINTING

FIELD OF THE INVENTION

The present invention relates to a printing control apparatus, printing control method, and printing control program and, more particularly, to a printing control apparatus, printing control method, and printing control program which control a printing apparatus capable of printing index information on the tab portions of tab sheets to accurately print the index information at predetermined positions on the tab portions when making the printing apparatus print the index information.

BACKGROUND OF THE INVENTION

Conventionally, printing apparatuses having a function (tab sheet printing function) of printing index information on the tab portions of tab sheets have been known. Such printing apparatuses are guaranteed to accurately print index information only on specific tab sheets available from paper makers designated by the apparatus makers.

Printing control of such a printing apparatus is performed by a printing control apparatus which is provided for the printing apparatus to control it, or a printing control apparatus (information processing apparatus) as a computer which is communicatively connected to the printing apparatus and generate print data to be printed by the printing apparatus.

In some cases, however, a user may randomly purchase general tab sheets which are not those on which printing can be done by the printing apparatus. Assume that the tab sheets which the user purchased are not those guaranteed by the printing apparatus maker. In this case, if the tab portions differ in shape and size from those designated by the maker, printed index information is likely to undergo print offsets. As a consequence, tab sheets which are expensive compared with plain paper are wasted due to the print offsets of the index information.

SUMMARY OF THE INVENTION

The present invention has been made to solve the above problem and, has as its object to provide a printing control apparatus, printing control method, and printing control program which control a printing apparatus to accurately print index information on the tab portions of a plurality of types of tab sheets when printing index information on the tab portions of tab sheets.

In order to achieve the above object, a printing control apparatus according to an embodiment of the present invention is configured as follows. There is provided a printing control apparatus which controls a printing apparatus capable of printing on a tab portion of a tab sheet, comprising first setting means for setting position information of the tab portion, second setting means for setting a print position of index print data to be printed on the tab portion, and test print data creation means for creating test print data on the basis of the position information of the tab portion which is set by the first setting means and the print position of the index print data to be printed on the tab portion which is set by the second setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing an example of how index information is printed on each tab portion of a tab sheet set by using the printing system according to the present invention;

FIG. 13B is a view for explaining a procedure for measuring the horizontal print position offset amount ΔL by using the method in FIG. 13A;

FIG. 14B is a view for explaining a procedure for measuring the vertical print position offset amount ΔL by using the method in FIG. 14A;

DETAILED DESCRIPTION OF THE PREFERRED EMBODIMENTS

Preferred embodiments of the present invention will now be described in detail in accordance with the accompanying drawings.

First Embodiment

A printing system constituted by a printing control apparatus and printing apparatus according to an embodiment of the present invention will be described below with reference to the accompanying drawings. Although an information processing apparatus (host computer) and laser beam printer will be exemplified as a printing control apparatus for printing control and a printing apparatus, respectively, the present invention is not limited to those described.

In addition, the present invention is not limited to a printing system constituted by a host computer and printer as long as the functions of the present invention are implemented. For example, a controller for a printing apparatus may be designed to perform control to realize the present invention. In addition, the present invention may be applied to a system designed to perform processing through a network such as a LAN or WAN.

A tab sheet is a sheet (see, for example, FIG. 3A) having a tab portion on which index information is written. A tab sheet is inserted between a plurality of pages of a document to allow the user to intuitively recognize classification/assortment of the contents written on the document. In general, a plurality of tab sheets having tab portions at different positions are stacked on each other to form one set (tab sheet set).

Outline of First Embodiment

A method of accurately printing index information on tab sheets by using the above printing system in the first embodiment will be described below.

In the first embodiment, information about print areas on which index information is to be printed is set, and before the index information is printed on the tab portion of each tab sheet on the basis of the print area information, test print data for printing, on one test printing sheet (an opaque sheet such as plain paper) in advance, all pieces of index information to be printed on the respective tab sheets and boundary lines indicating the print areas of index areas is generated, and test printing is executed.

This test printing sheet (an opaque sheet such as plain paper) is then superimposed on the tab sheets to perform eye measurement of print offset amounts caused when printing is performed on the actual tab sheet set. The print areas for the index information are adjusted (reset) by using the eye measurement values.

Lastly, print data is generated on the basis of the information of the reset index print data, and the index information is printed on the tab portions of the tab sheets. Since index information can be accurately printed on tab sheets in this manner, there is no possibility of wasting tab sheets, which are expensive compared with plain paper, due to print offsets.

Figure 1:
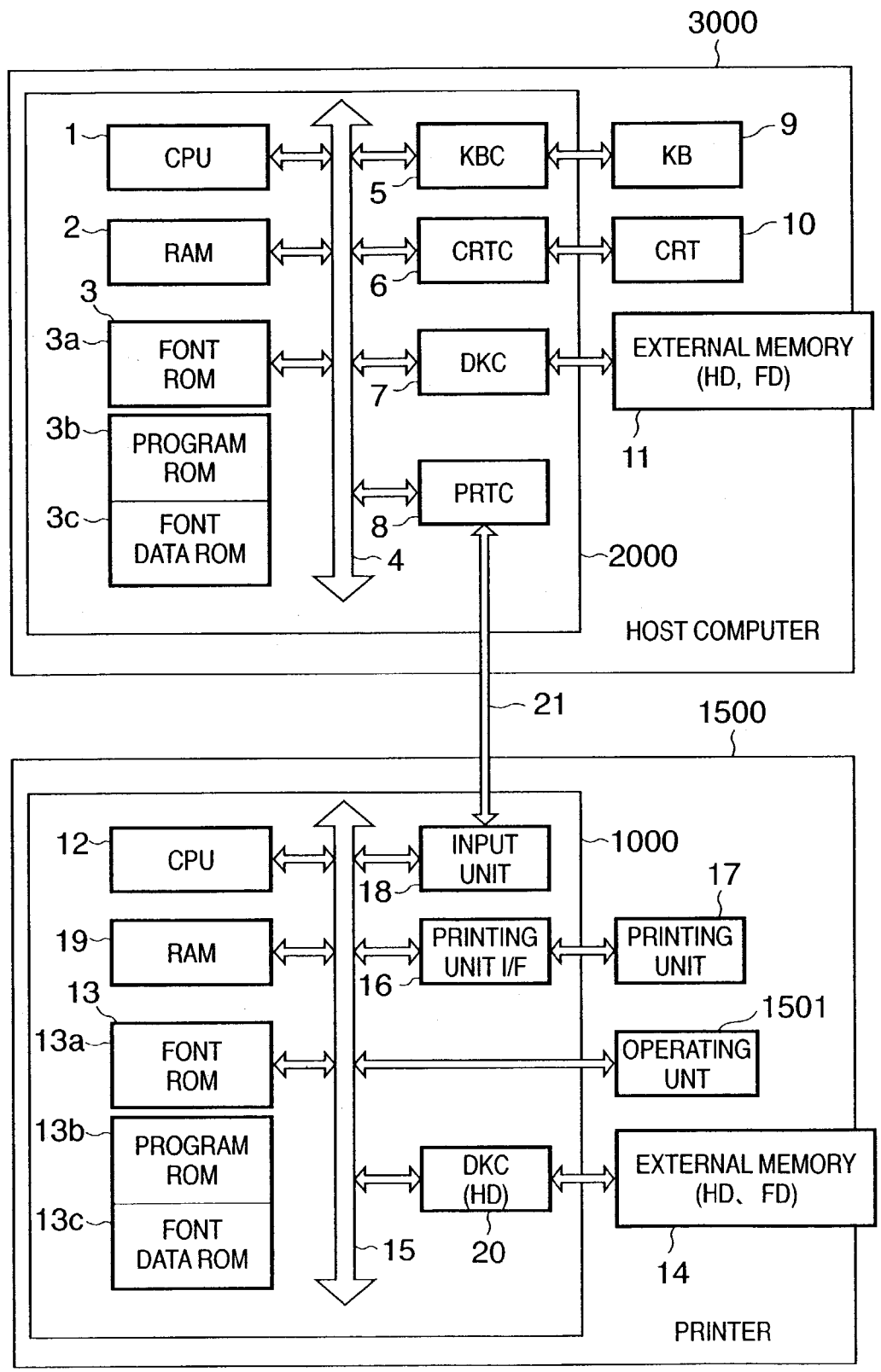
FIG. 1 is a block diagram showing the overall arrangement of a printing system according to the present invention.

[Arrangement of Printing System: FIG. 1]

FIG. 1 is a block diagram showing the overall arrangement of the printing system according to the first embodiment of the present invention. A laser beam printer 1500 is connected to a host computer 3000.

Referring to FIG. 1, the host computer 3000 includes a ROM 3 constituted by a font ROM 3a, program ROM 3b, and font data ROM 3c. The host computer 3000 includes a CPU 1 which executes document processing for a document with a mixture of graphic patterns, images, characters, tables (including spreadsheet), and the like on the basis of the document processing program stored in the program ROM 3b of the ROM 3 or an external memory (HD, FD) 11 such as a hard disk or floppy disk. The CPU 1 systematically controls the respective devices connected to a system bus 4.

An operating system program (to be referred to as an "OS" hereinafter) as a control program for the CPU 1 and the like are stored in the program ROM 3b of the ROM 3 or the external memory 11. Font data to be used for the above document processing is stored in the font ROM 3a of the ROM 3 or the external memory 11. Various data to be used for the above document processing and the like, e.g., programs for various types of page description languages and font rasterizing data, are stored in the font data ROM 3c of the ROM 3 or the external memory 11.

Reference numeral 2 denote a RAM that can be expanded by an optional RAM and the like and functions as a main memory, work area, and the like for the CPU 1; and 5, a keyboard controller (KBC) which controls key input from a keyboard (KB) 9 and a pointing device (not shown).

Reference numeral 6 denotes a CRT controller (CRTC) which performs display control of a CRT display (CRT) 10; 7, a disk controller (DKC) for controlling access to the external memory 11 which stores a boot program, various applications, font data, user files, edit files, printer control command creating program (to be referred to as a "printer driver" hereinafter), and the like; and 8, a printer controller (PRTC) which is connected to the printer 1500 via a predetermined bidirectional interface 21 to execute communication control processing between the host computer and the printer 1500.

Note that the CPU 1 executes, for example, rasterization processing of an outline font into the display information RAM area set in the RAM 2 to realize WYSIWYG (What You See Is What You Get) on the CRT 10, i.e., allows the document, graphic patterns, and the like created by software in the computer to be printed by the printer as they are displayed on the display. The CPU 1 also opens various registered windows on the basis of the commands designated by a mouse cursor on the CRT 10, and executes various types of data processing.

In the execution of printing, the user can make printer settings and settings for a printing processing method for the printer driver, including selection of a printing mode, by opening a window associated with settings for printing.

The printer 1500 is controlled by a printer CPU 12. The printer CPU 12 includes a ROM 13 constituted by a font ROM 13a, program ROM 13b, and data ROM 13c, and systematically controls access to various devices connected to a system bus 15 on the basis of the control programs and the like stored in the program ROM 13b or an external memory (HD, FD) 14 such as a hard disk, floppy disk, or IC card, thereby outputting an image signal as output information to a printing unit (printer engine) 17 connected to the printer CPU 12 via a printing unit interface (I/F) 16.

Control programs and the like that can be executed by the printer CPU 12 are stored in the program ROM 13b. Font data (including outline font data) and the like used for the creation of the above output information are stored in the font ROM 13a. Information and the like that are used on the host computer 3000 if the printer 1500 has no external memory like a hard disk are stored in the data ROM 13c.

An operating unit 1501 is an operation panel which has switches for operation, LED display device, and the like arranged thereon (not shown). The printer CPU 12 can perform communication processing with the host computer 3000 via an input unit 18, and can notify the host computer 3000 of information and the like inside the printer 1500.

Reference numeral 19 denotes a RAM which mainly functions as a main memory and work area for the printer CPU 12, and is designed to increase the memory amount by an optional RAM connected to an expansion port (not shown). Note that the RAM 19 is used as an output information rasterization area, environment data storage area, NVRAM, and the like. The external memory 14 is connected as an option, and stores font data, an emulation program, form data, and the like.

In addition, the number of external memories described above is not limited to one. The printer may have at least one external memory and be designed to allow connection of a plurality of external memories storing programs for interpreting printer control languages based on different language systems, including an optional card in addition to an internal font ROM. The printer may further include an NVRAM (not shown) to store printer mode setting information from the operating unit 1501 on a user basis, group basis, or the like.

Figure 2:
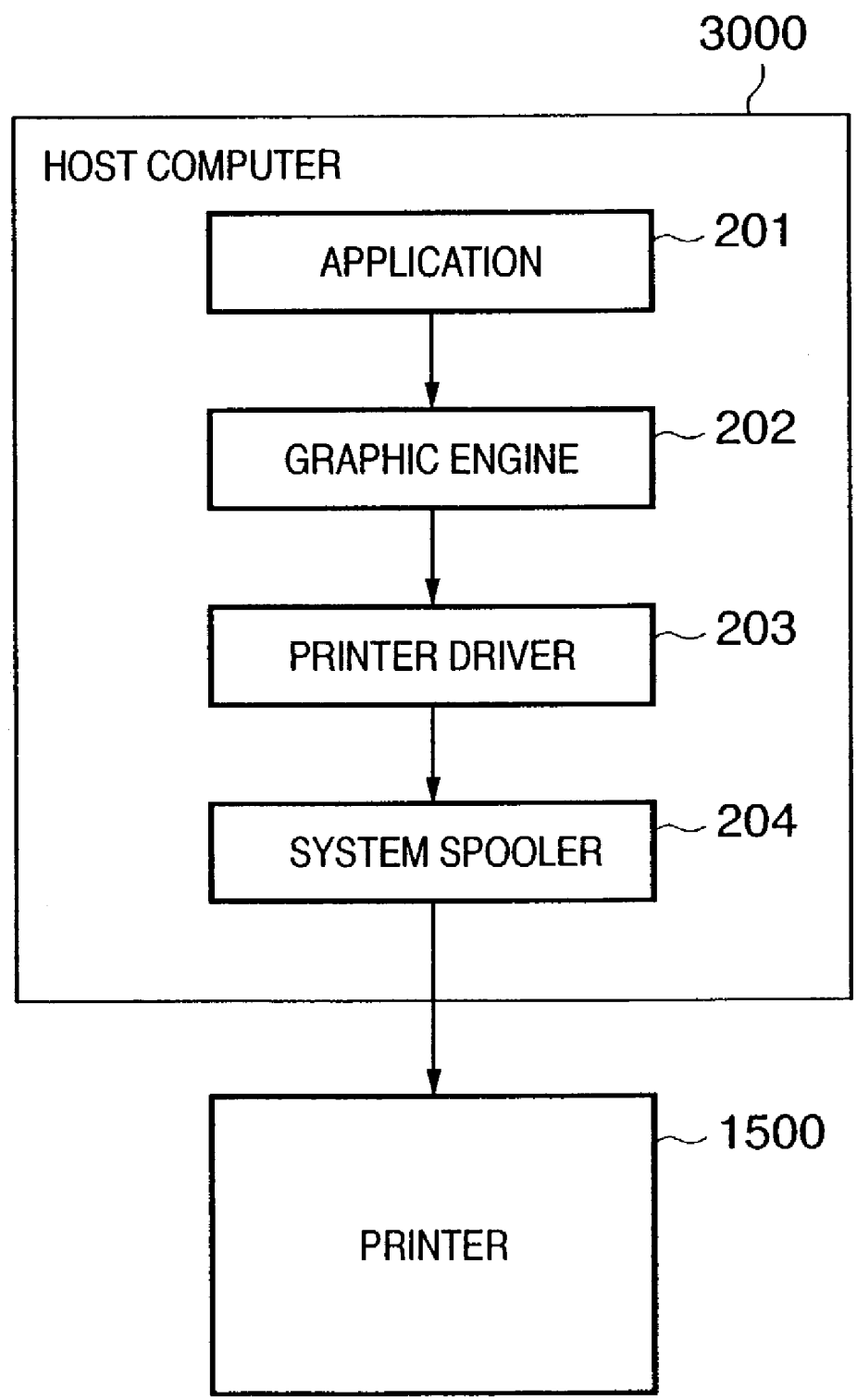
FIG. 2 is view showing the main functional blocks of the printing system.

[Functional Blocks of Printing System: FIG. 2]

FIG. 2 is a view showing the main functional blocks of this printing system.

An application 201, graphic engine 202, printer driver 203, and system spooler 204 in the host computer 3000 are program modules which exist as files stored in the external memory 11 and are loaded into the RAM 2 by the OS and modules that use the program modules when they are executed.

The application 201 and printer driver 203 can be stored in the FD as the external memory 11 or a CD-ROM (not shown) or stored in the HD as the external memory 11 via a network (not shown). The application 201 stored in the external memory 11 is loaded into the RAM 2 to be executed. When this application 201 causes the printer 1500 to print, output operation (drawing) is performed by using the graphic engine 202 that is loaded into the system bus 4 to be executed in the same manner. The graphic engine 202 loads the printer driver 203 prepared for each printing apparatus from the external memory 11 into the RAM 2 in the same manner, and converts an output from the application 201 into a printer control command by using the printer driver 203. The converted printer control command is output to the printer 1500 via the system spooler 204 loaded into the RAM 2 by the OS and the interface 21.

Figure 3A:
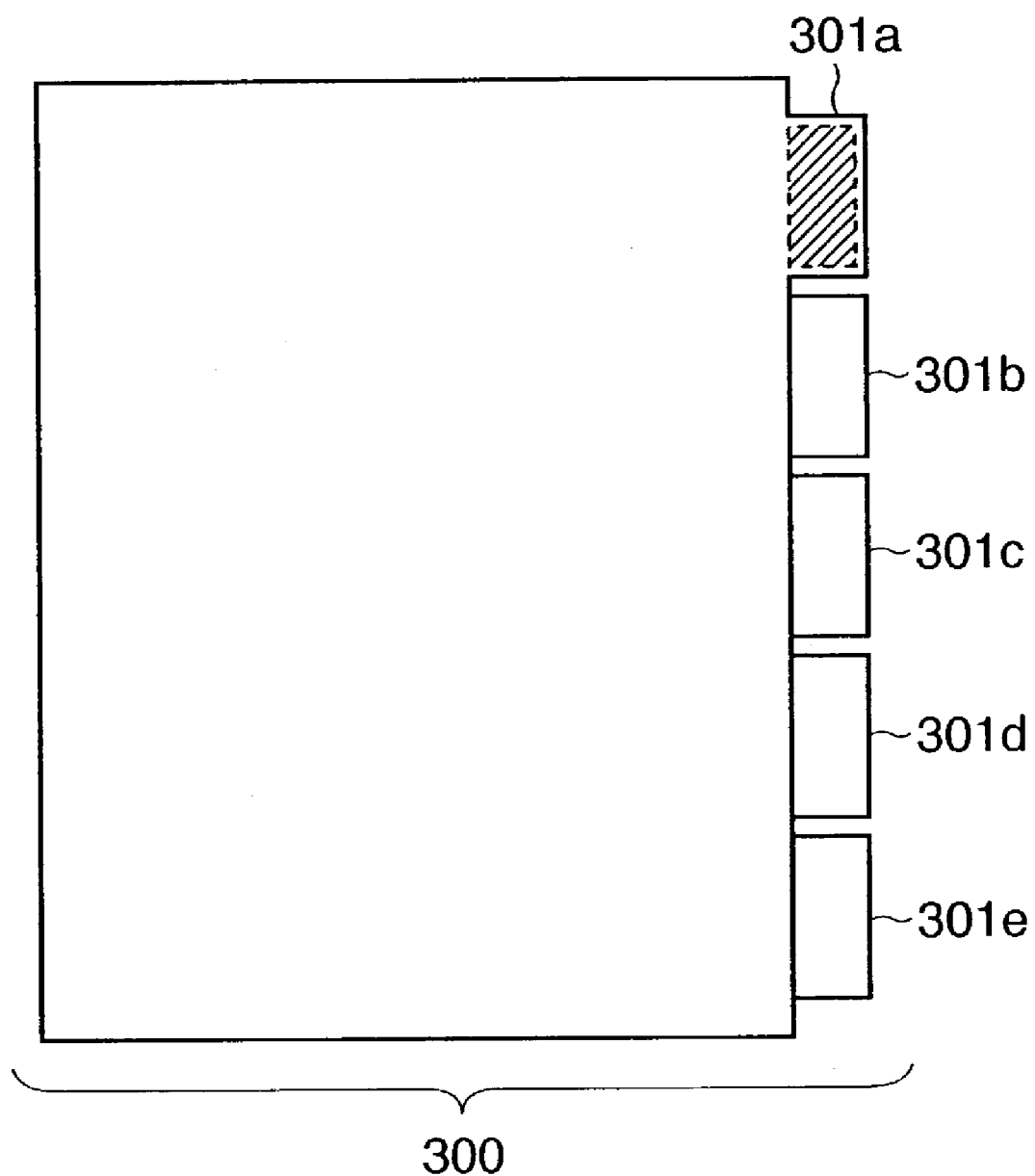
FIG. 3A is a view showing an example of a tab sheet set (e.g., a set of five sheets)
Figure 3B:
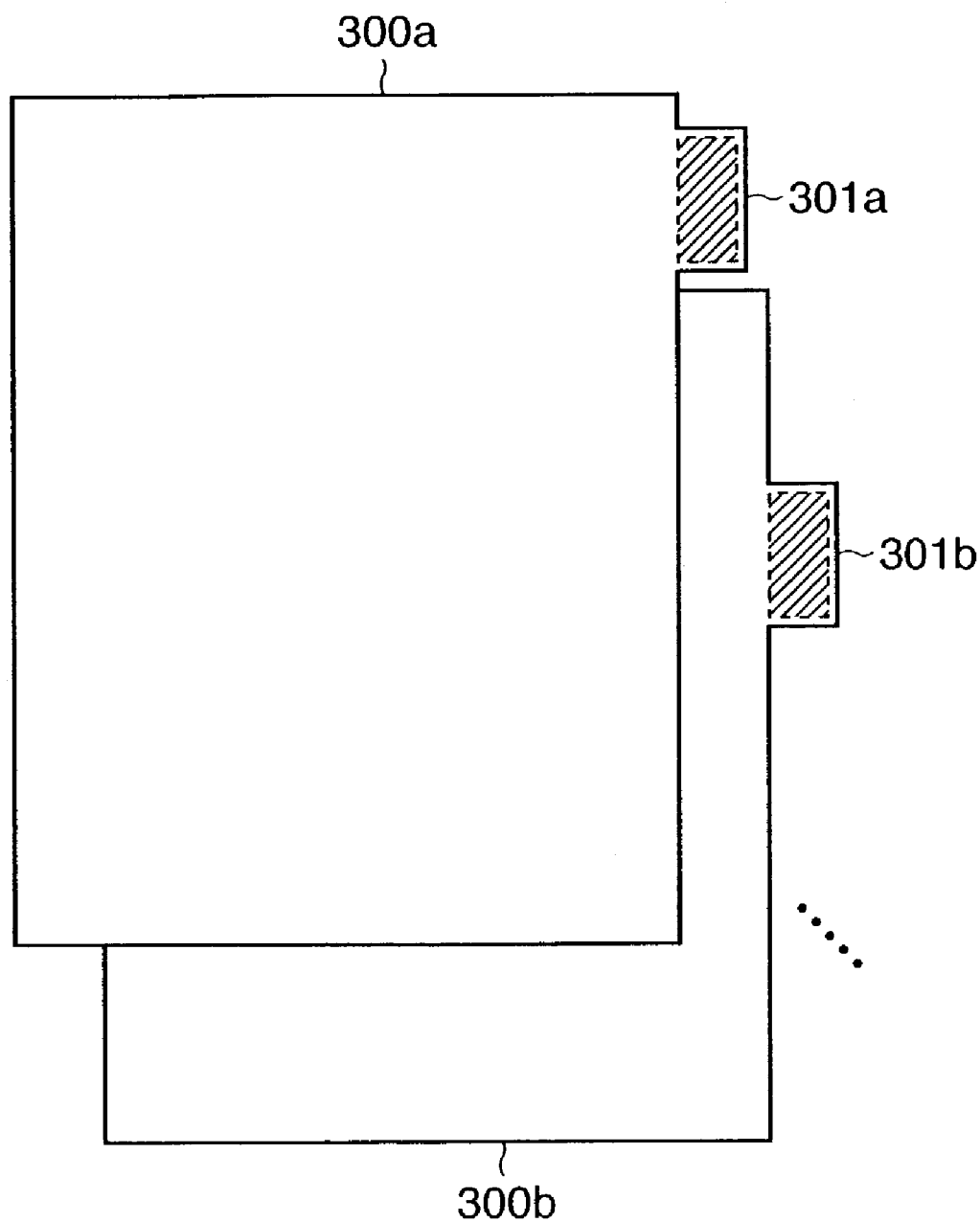
FIG. 3B is a view showing an example of a tab sheet set (e.g., a set of five sheets)
Figure 3C:
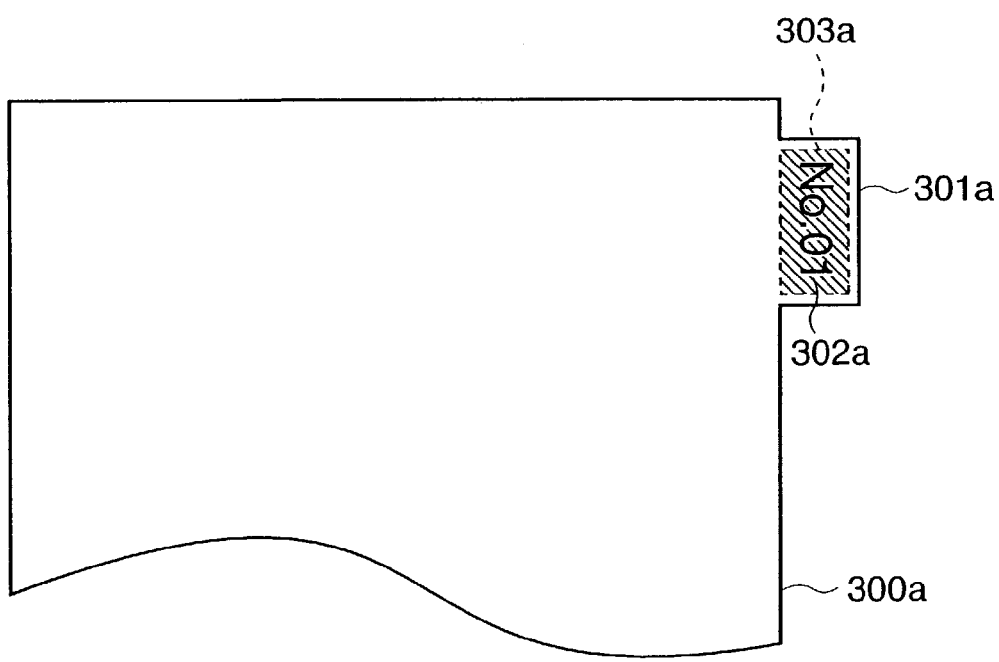
FIG. 3C is an enlarged view of a portion near the tab portion of the tab sheet in FIG. 3A.

[Tab Sheet and Tab Sheet Set: FIGS. 3A to 3C]

FIGS. 3A to 3C are views showing an example of a tab sheet set 300.

For example, tab sheets are sheets 300a to 300e having tab portions 301a to 301e like those shown in FIG. 3A. The tab sheet set 300 is one set of a plurality of (e.g., five) sheets 300a to 300e having the tab portions 301a to 301e at different positions. The tab sheets 300a to 300e on which index information is written are inserted between a plurality of pages of a document to allow the user to intuitively recognize the classification of the contents written on the document.

The respective tab portions 301a to 301e have index areas 303a to 303e inside, on which the index information of the respective tab sheets, an example of which is shown in FIG. 3C, is written (printed). In the tab sheet set 300, the tab portions 301a to 301e of the respective tab sheets are arranged so as not to overlap each other.

Note that the respective tab sheets 300a to 300e, excluding the index areas 303a to 303e, are equal in size, and have a standard size such as letter size or A4 size. FIG. 3B shows the shapes of the first and second tab sheets 300a and 300b of the tab sheet set constituted by five sheets. Although the number of sheets of a commercially available tab sheet set is not limited to five, the tab sheet set 300 constituted by five sheets will be exemplified below.

FIG. 3A shows a case wherein the sheets of the tab sheet set 300 are arranged in advance as tab sheets to be inserted into a document that opens to left. Although commercially available tab sheet sets are not limited to those for documents that open to left, the tab sheet set 300 constituted by five sheets for a document that opens to left will be exemplified.

FIG. 3C is an enlarged view of part of FIG. 3B and shows a case wherein the index information "No. 01" (302a) is printed in the index area 303a of the first sheet. Although FIG. 3C shows a case wherein the index information "No. 01" is printed in landscape orientation, printing may be done in portrait orientation.

[Printing of Index Information: FIG. 4]

FIG. 4 shows an example of the tab portions 301a to 301e of the tab sheet set 300 before and after index information is printed by using the printing system according to this embodiment, i.e., a case wherein the sheets of the tab sheet set having no index information printed in the index areas are stacked on each other (before printing of index information), and a case wherein all the tab sheets 300a to 300e are stacked on each other to form the tab sheet set 300 after index information is printed on each of the tab sheets 300a to 300e (after printing of index information).

Figure 5A:
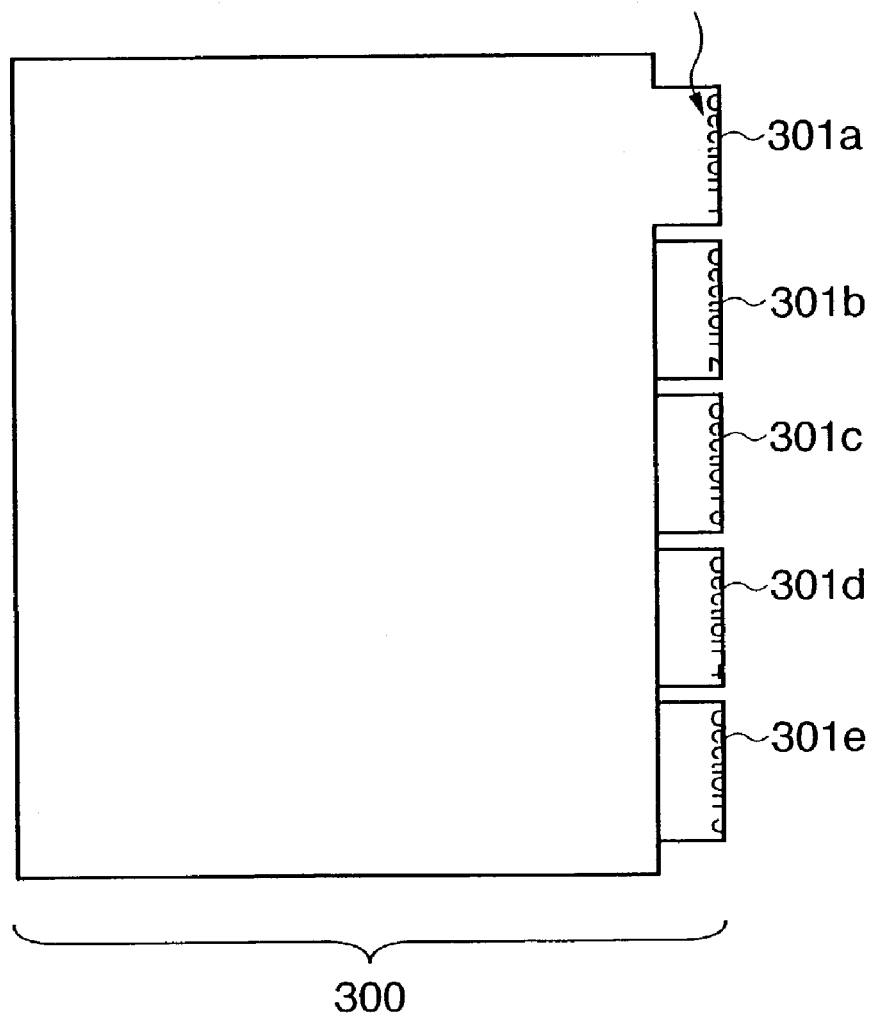
FIG. 5A is a view showing an example of how index information is printed on each tab portion of a tab sheet set by using a conventional printing system which cannot adjust the print position of index information.
Figure 5B:
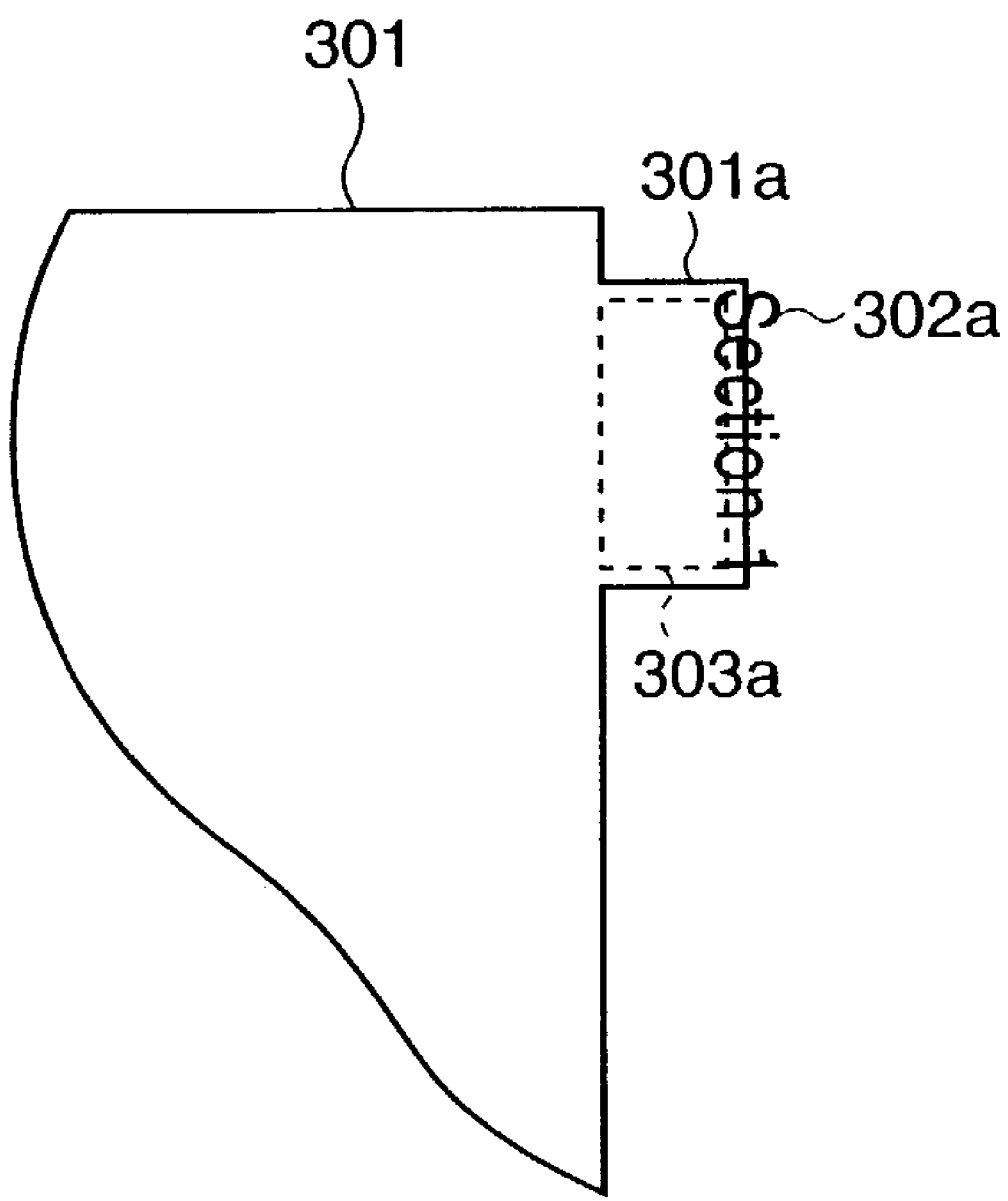
FIG. 5B is an enlarged view of a portion near the tab portion of the tab sheet in FIG. 5A.

[Printing of Index Information by Conventional System: FIGS. 5A and 5B]

A problem in the conventional printing system will be described in more detail before the description of a method of adjusting the print position of index information by using the printing system according to this embodiment described above.

FIGS. 5A and 5B show, as a comparative example, an example of the tab sheet set after printing of index information in the index areas by using the conventional printing system having no adjustment function for the print position of index information with respect to each index area.

FIG. 5A shows a case wherein index information is printed while each print position is offset from the index area of a corresponding one of the sheets. FIG. 5B is an enlarged view of an offset of the index information printed on the first tab sheet.

The solid line in FIG. 5B indicates the contour of the tab sheet 301a, and the area enclosed with the broken line indicates the index area 303a on which index information can be printed. FIG. 5B shows a case wherein "Section 1" as index information 302a of the first sheet is printed with an offset to the right with respect to the tab sheet.

In the case shown in FIG. 5B, since index information is printed with its print position being offset from the index area of each sheet to result in print omissions, all the contents of the index information cannot be read from the print result. That is, these sheets fail to serve as tab sheets in practice.

As described above, when index information is printed on each tab sheet by using the conventional tab sheet printing system having neither the adjustment function for the print position of each index information nor the test printing function, there is a possibility that print offset of index information may occur to waste tab sheets which are expensive compared with plain paper.

[Print Position Setting for Index Information]

The printing system according to this embodiment will be described next. The following description exemplifies the settings to be made to print index information on the tab portion (index area) of each tab sheet without causing any print offset by using the above printing system.

Figure 6:
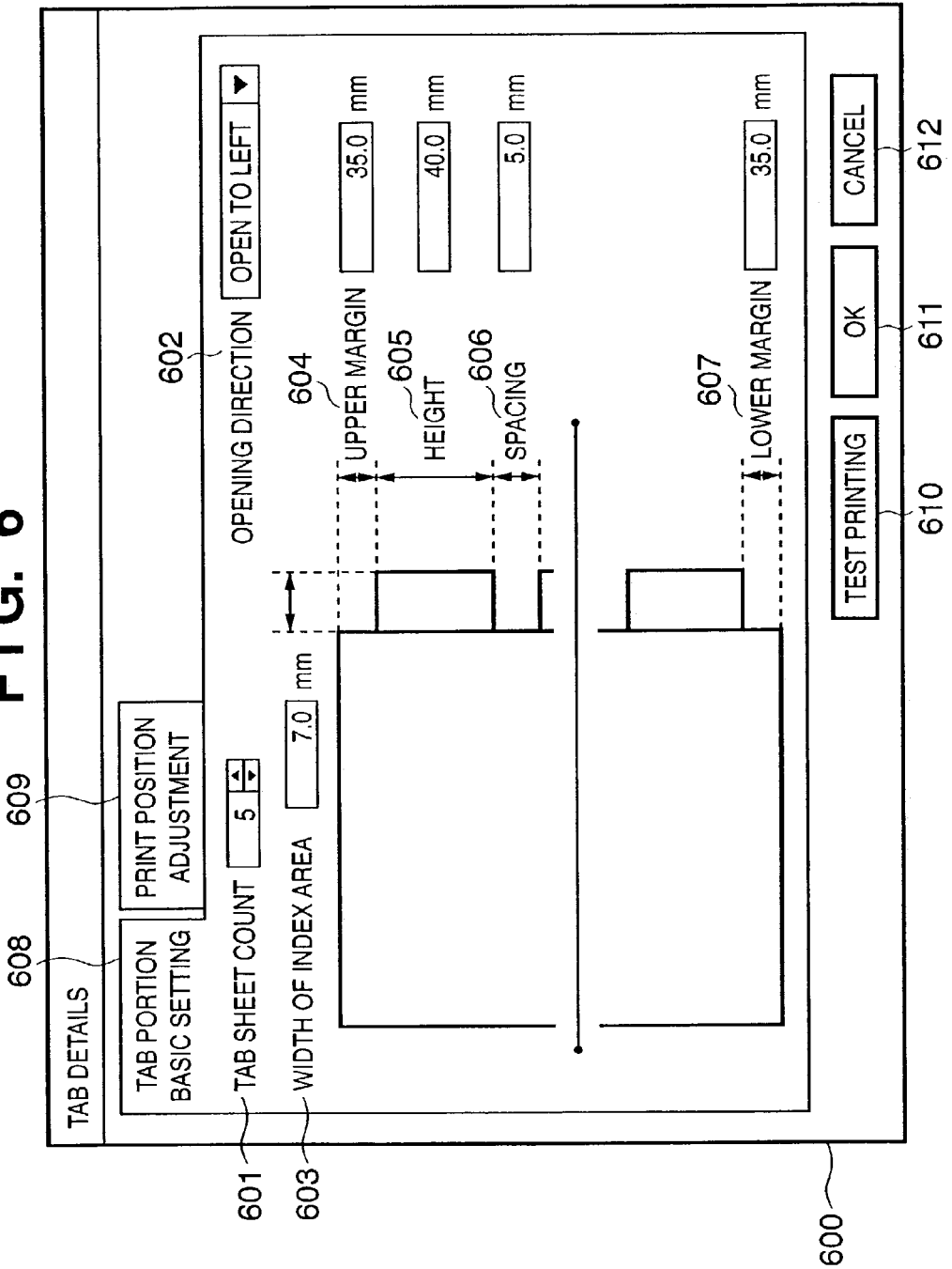
FIG. 6 is a view showing a tab sheet basic setting window in which a user inputs basic setting values for tab sheets and tab portions.

[Position Information Setting for Tab Portions: FIG. 6]

FIG. 6 shows a tab portion basic setting window 600 which is a user interface for setting a basic position at which index information is to be printed on each tab portion of the tab sheet set 300 in this embodiment. In the tab portion basic setting window 600 in FIG. 6, the following designations are made by the user of this system.

The user designates the number of tab sheets constituting a tab sheet set ("tab sheet count" 601), the opening direction (open to left or right) of a document in which tab sheets are to be inserted ("opening direction" 602; drop down list control), the width of each index area ("width" 603), the height of each index area ("height" 605), the spacing between the respective index areas ("spacing" 606), the offset value from the upper end of the first tab sheet to the upper end of the index area ("upper margin" 604), and the offset value from the lower end of the last tab sheet to the lower end of the index area ("lower margin" 607).

Figure 7:
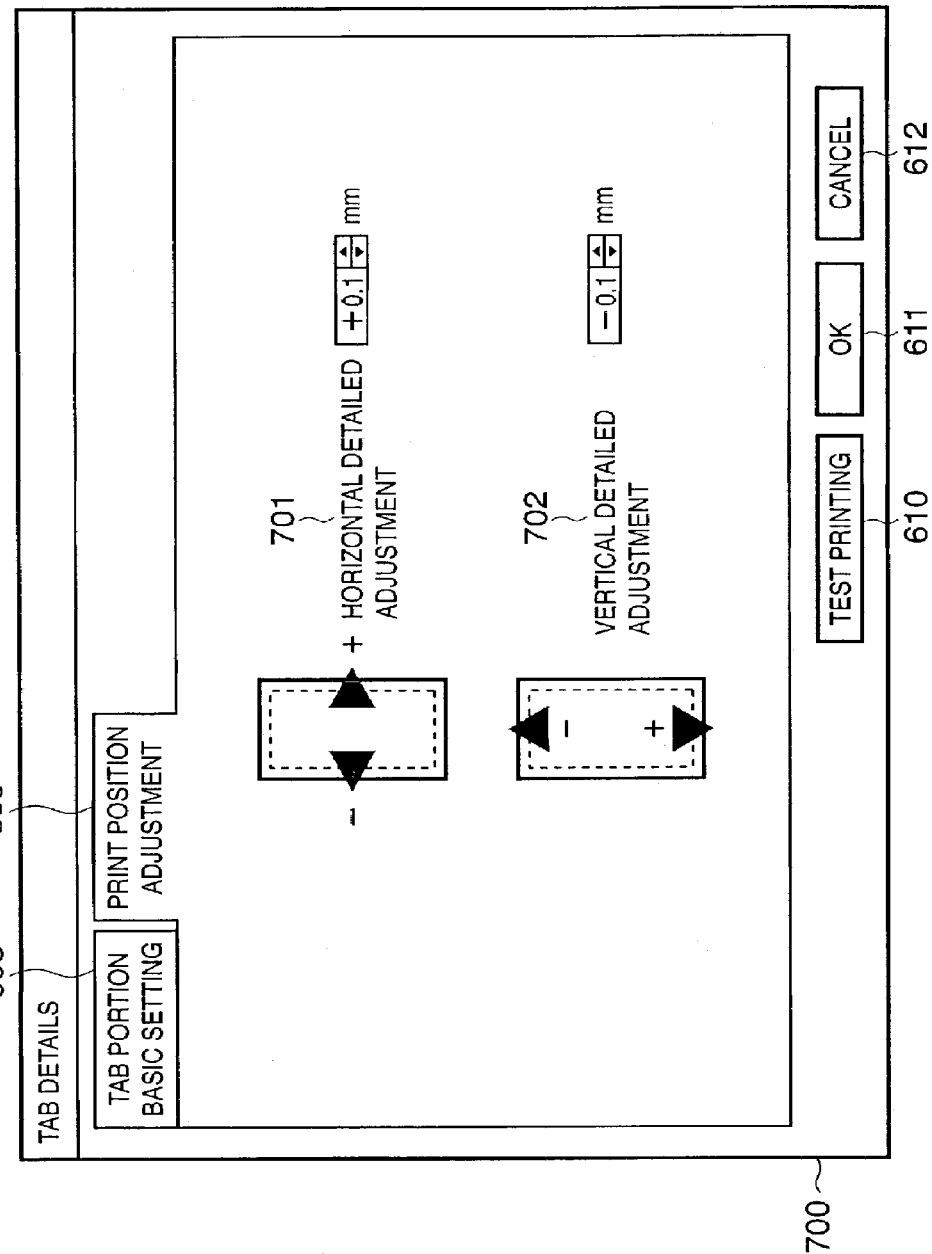
FIG. 7 is a detailed print position adjustment window in which the user inputs detailed adjustment values for the print position of index information.

[Print Position Setting for Index Information: FIG. 7]

When input operation in the tab portion basic setting window 600 described above is completed, "print position adjustment" 609 is selected by the user of this system, and the current window shifts to a detailed print position adjustment window 700.

Referring to FIG. 7, the user adjusts the print position of the index information basically set in the tab portion basic setting window 600 on the basis of offset amounts ΔL obtained on the basis of the result of test printing on a test printing sheet (to be described later). When the user of this system selects "tab portion basic setting" 608 in the detailed print position adjustment window 700 shown in FIG. 7, he/she can return to the tab portion basic setting window 600 in FIG. 6.

In the detailed print position adjustment window 700 shown in FIG. 7, the user of this system designates the shift amount of the print position of the index information in the horizontal direction (the widthwise direction of a tab sheet) ("horizontal detailed adjustment" 701), and a shift amount of the print position of the index information in the vertical direction (the longitudinal direction of a tab sheet) ("vertical detailed adjustment" 702).

In the case shown in FIG. 7, when the user designates a positive value (e.g., +0.1) with "horizontal detailed adjustment" 701, the print position of the index information is shifted to the right in the horizontal direction. When the user designates a negative value with "horizontal detailed adjustment" 701, the print position of the index information is shifted to the left in the horizontal direction.

Likewise, in the case shown in FIG. 7, when the user designates a positive value with "vertical detailed adjustment" 702, the print position of the index information is shifted downward in the vertical direction. When the user designates a negative value (e.g., −0.1) with "vertical detailed adjustment" 702, the print position of the index information is shifted upward in the vertical direction.

When a "test printing" button 610, "OK" button 611, and "cancel" button 612 arranged on the lower end of the user interface shown in FIGS. 6 and 7 are pressed, control is performed to execute test printing, printing on tab sheets, and interruption of tab printing, respectively. The "test printing" button 610, "OK" button 611, and "cancel" button 612 will be described in detail later.

Figure 8:
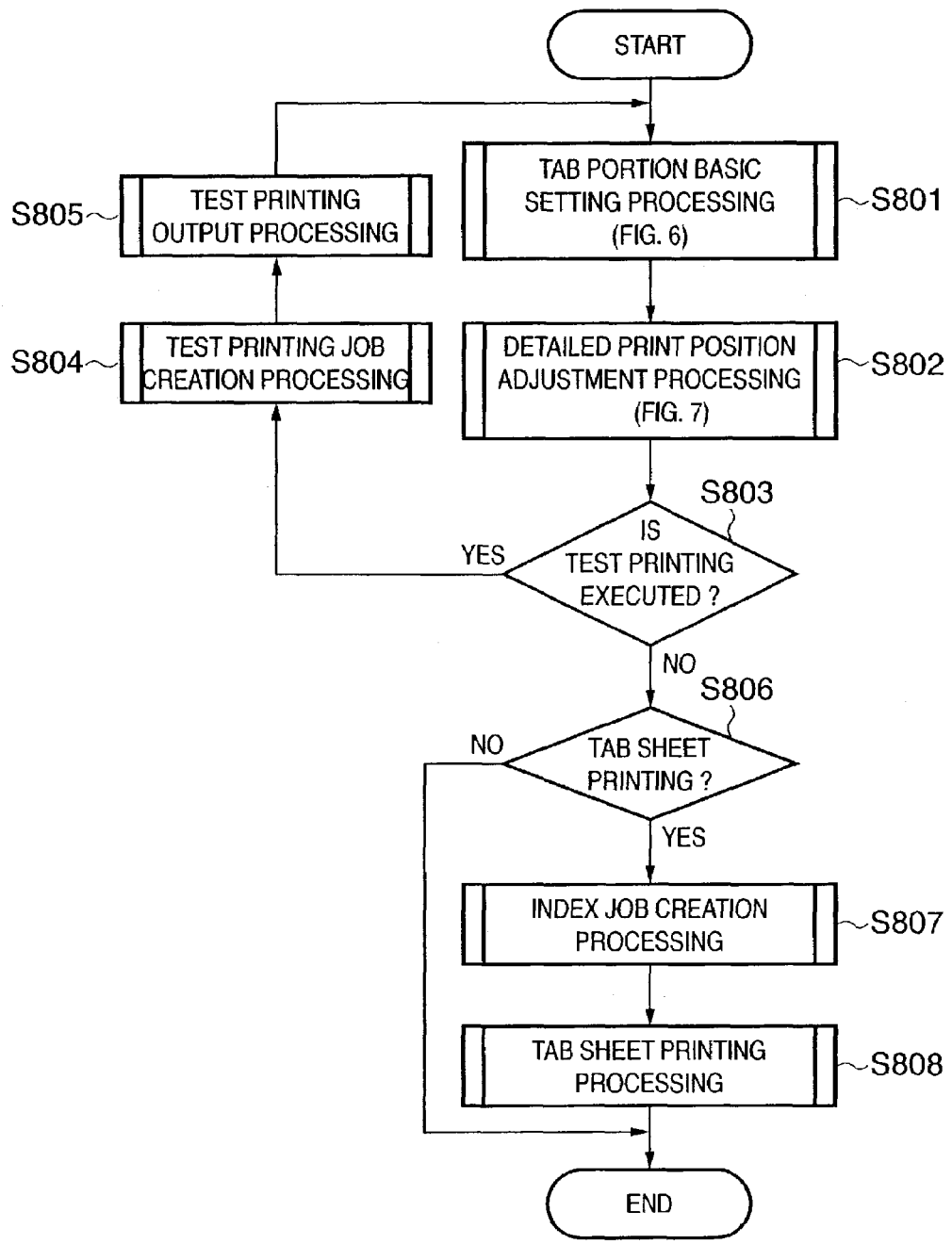
FIG. 8 is a flow chart showing adjustment processing for the print position of index information.

[Adjustment Processing of Print Position of Index Information: FIG. 8]

FIG. 8 is a flow chart showing adjustment processing of the print position of index information in this embodiment.

Although a detailed description will be omitted, it should be noted that before the execution of this processing flow, settings, e.g., the contents of the respective index information as index print data to be printed on the respective tab sheet (e.g., "Section 1" to "Section 5" and the like in FIG. 4), the direction of the character string of each index information (e.g., portrait orientation, landscape orientation, landscape 180° rotation, or the like), line feed positions, colors to be printed, and a character size corresponding to the size of each print area in which the index information is to be printed, have already been made in a user interface window (not shown). Note that in association with character size setting, when the print area determined by the contents of the index information, character string direction, and line feed direction does not fit in the index area, automatic adjustment of the character size can be designated to make the print area fit in the index area.

In step S801 in FIG. 8, first of all, the user sets, in the tab portion basic setting window 600, basic information ("tab sheet count" 601, "opening direction" 602, "width" 603 of each index area, "height" 605 of each index area, "spacing" 606 between index areas, "upper margin" 604, and "lower margin" 607) associated with a purchased tab sheet set including the position information of each tab portion.

Since the respective setting items other than "opening direction" 602 have been described with reference to FIG. 6, a description thereof will be omitted, and "opening direction" 602 will be described with reference to FIGS. 9A to 11B.

[Opening Direction Setting: FIGS. 9A to 11B]

Figure 9A:
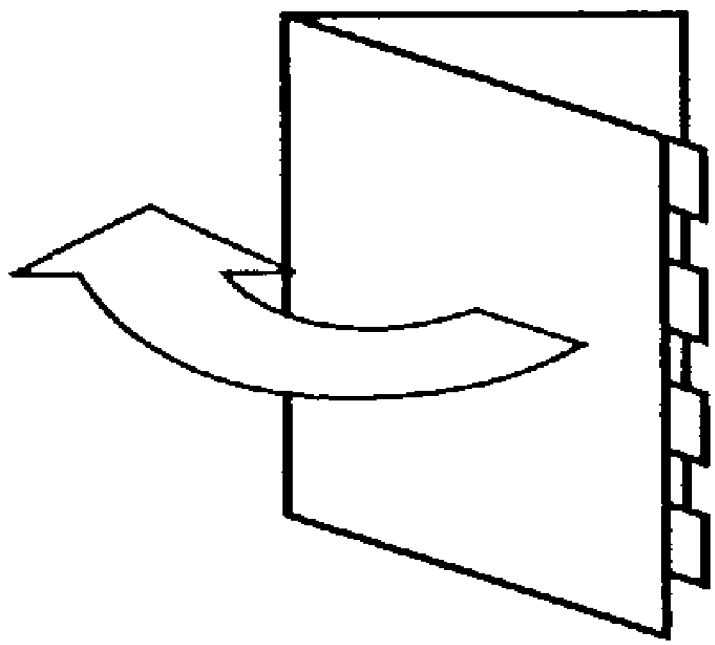
FIG. 9A is a view showing an example of a tab sheet set to be inserted into a document that opens to left.
Figure 9B:
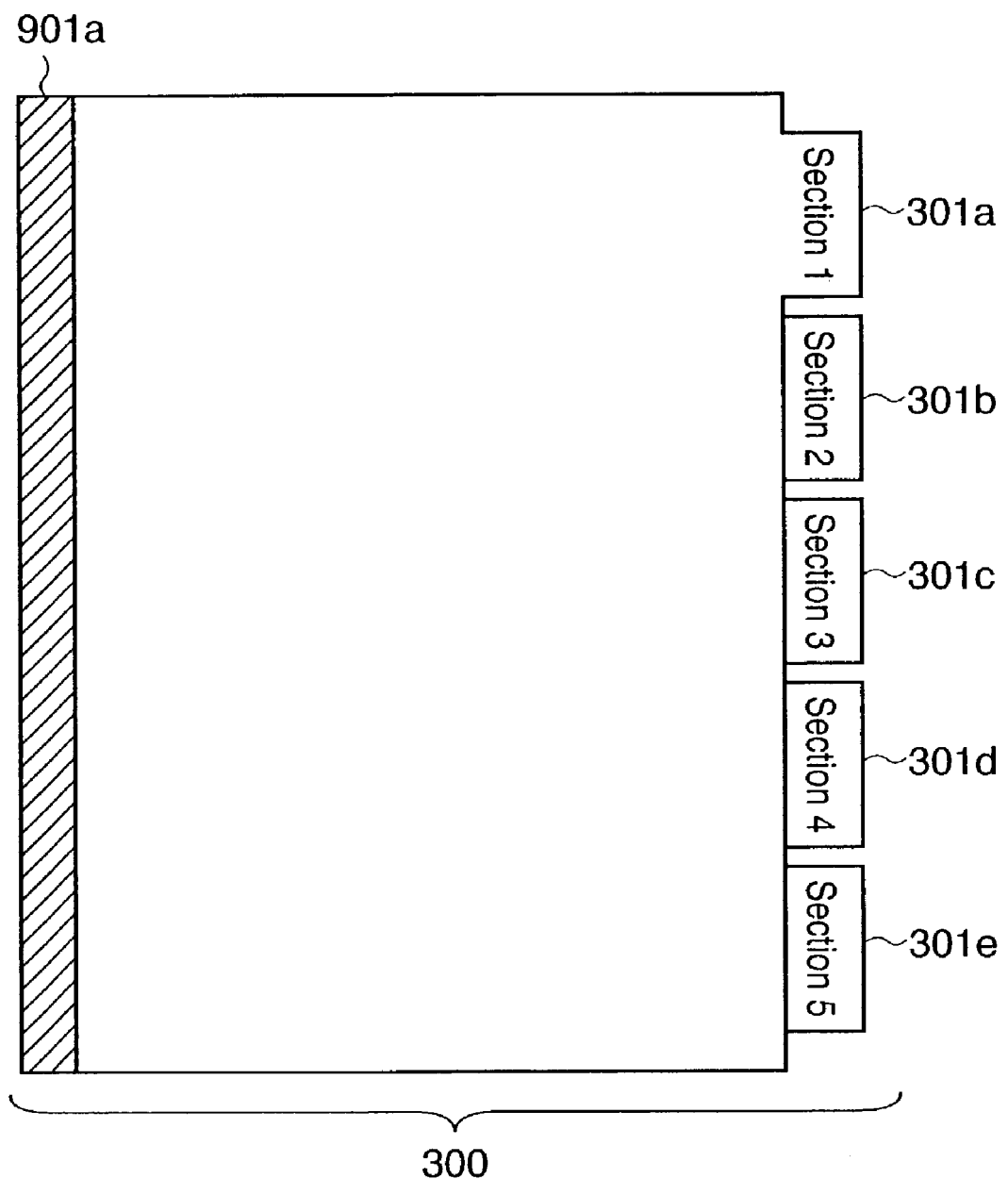
FIG. 9B is a view showing an example of a tab sheet set to be inserted into a document that opens to left.

FIGS. 9A and 9B show a case wherein a document in which tab sheets are to be inserted is an "open to left" document. As shown in FIG. 9A, the "open to left" document described here indicates a document whose pages are sequentially read from left to right. FIG. 9B shows an example of tab sheets 300 to be inserted into the "open to left" document. A binding position (left) 901a in this case is located on the left side of the index areas as indicated by the hatched rectangle in FIG. 9B.

Figure 10A:
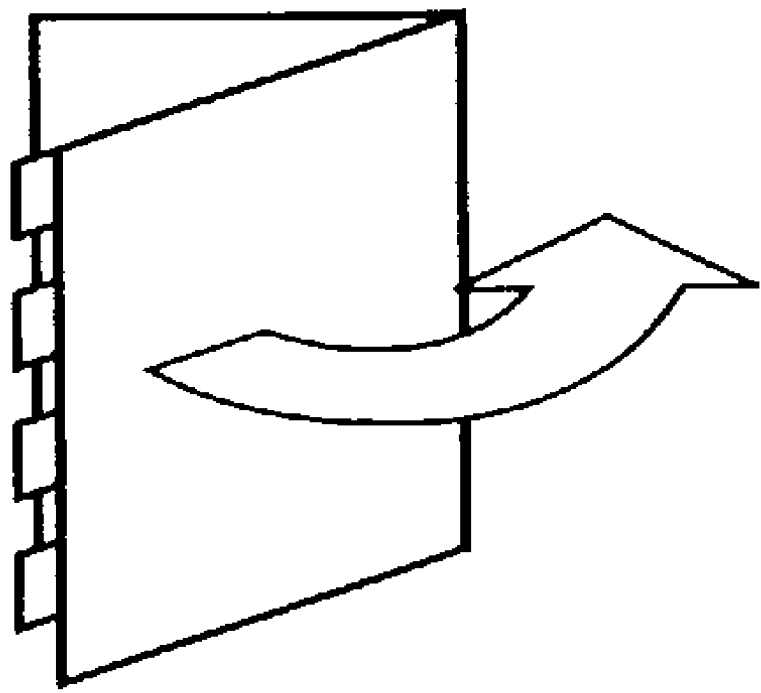
FIG. 10A is a view showing an example of a tab sheet set to be inserted into a document that opens to right.
Figure 10B:
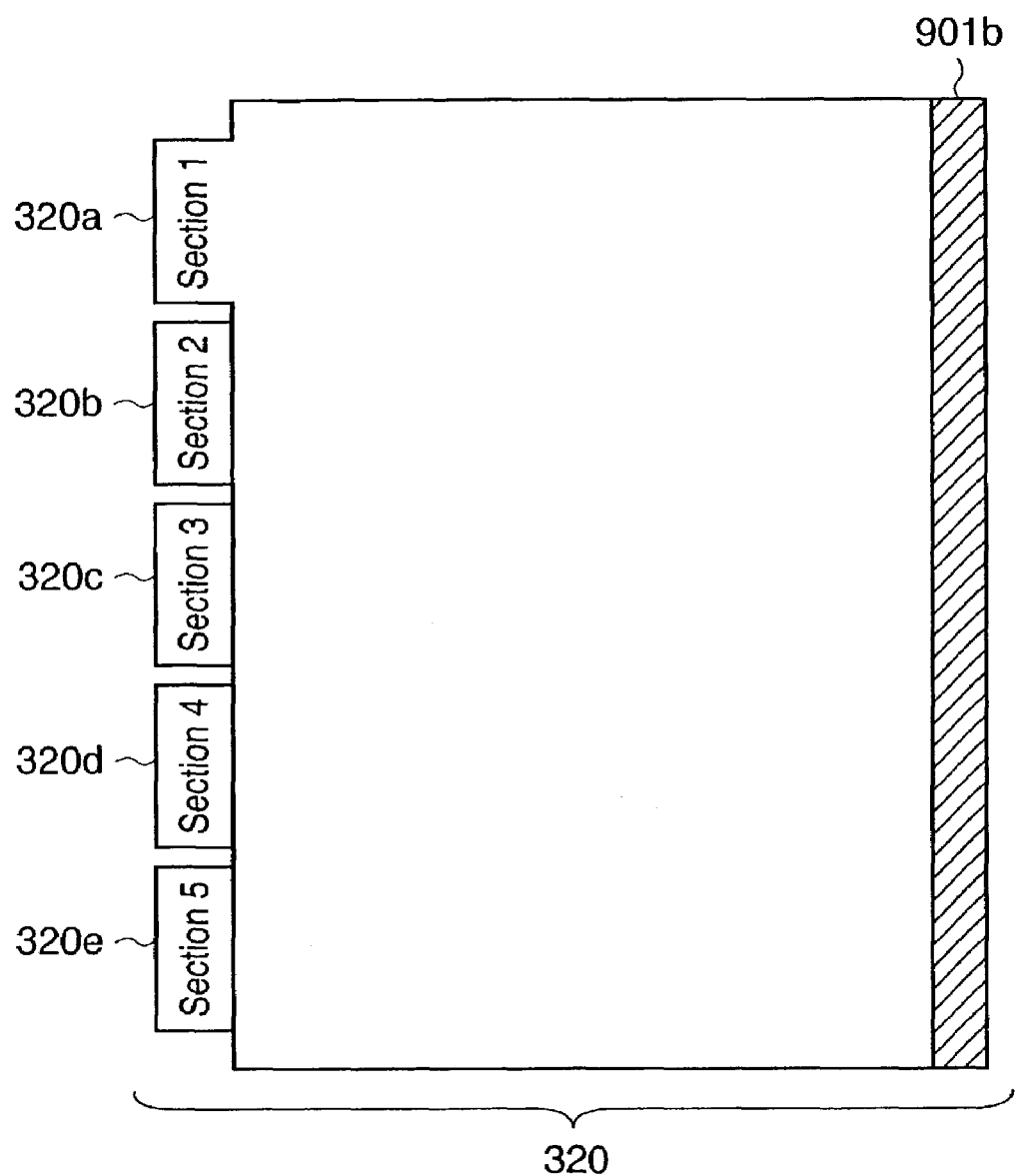
FIG. 10B is a view showing an example of a tab sheet set to be inserted into a document that opens to right.

FIGS. 10A and 10B show a case wherein a document which tab sheets are to be inserted is an "open to right" document. As shown in FIG. 10A, the "open to right" document described here indicates a document whose pages are sequentially read from right to left. FIG. 10B shows an example of tab sheets 320 to be inserted into the "open to right" document. A binding position (right) 901b in this case is located on the right side of the index areas as indicated by the hatched rectangle in FIG. 10B.

Figure 11A:
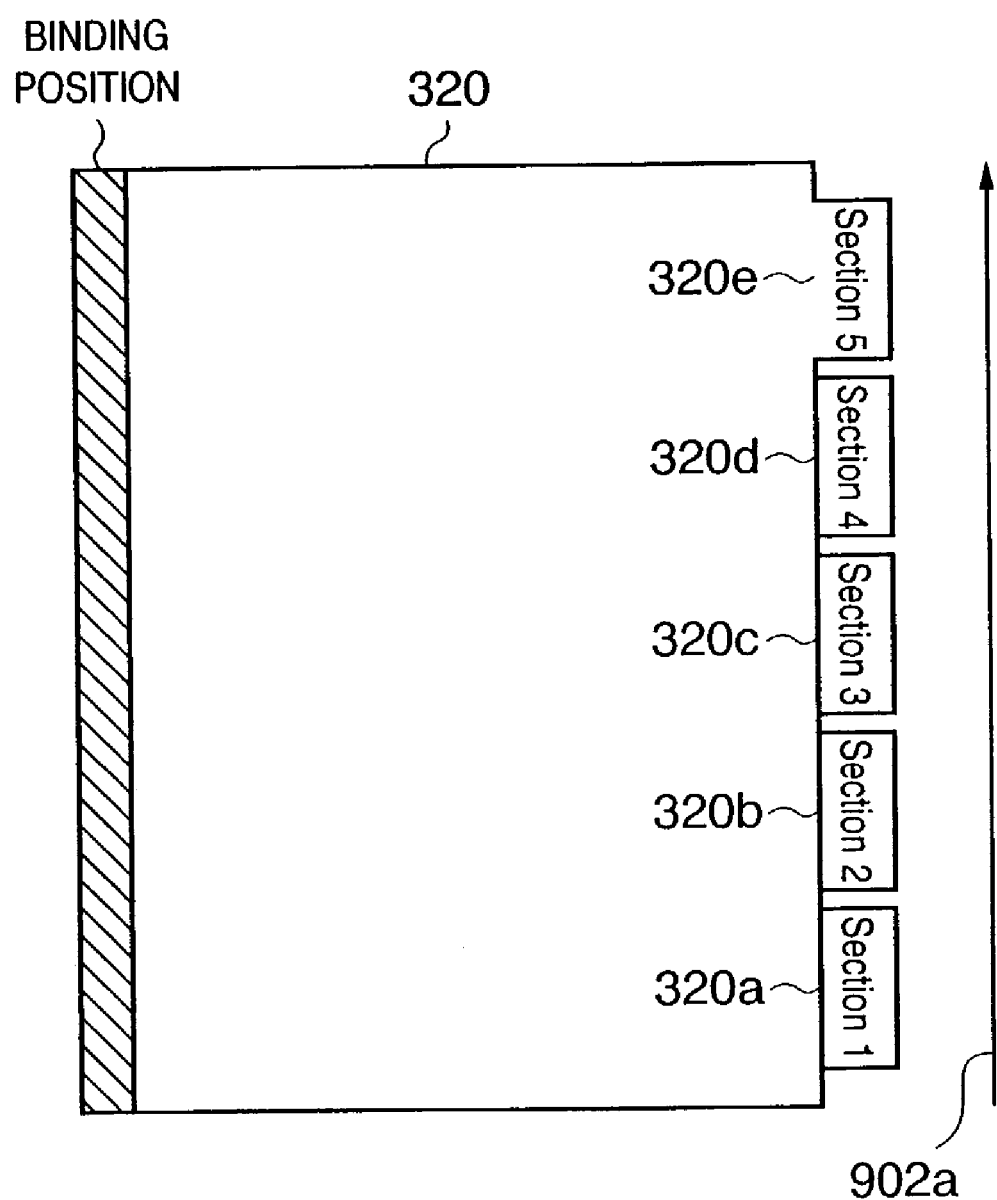
FIG. 11A is a view showing, for comparison, the order of index information on a tab sheet set to be inserted into a document that opens to left.
Figure 11B:
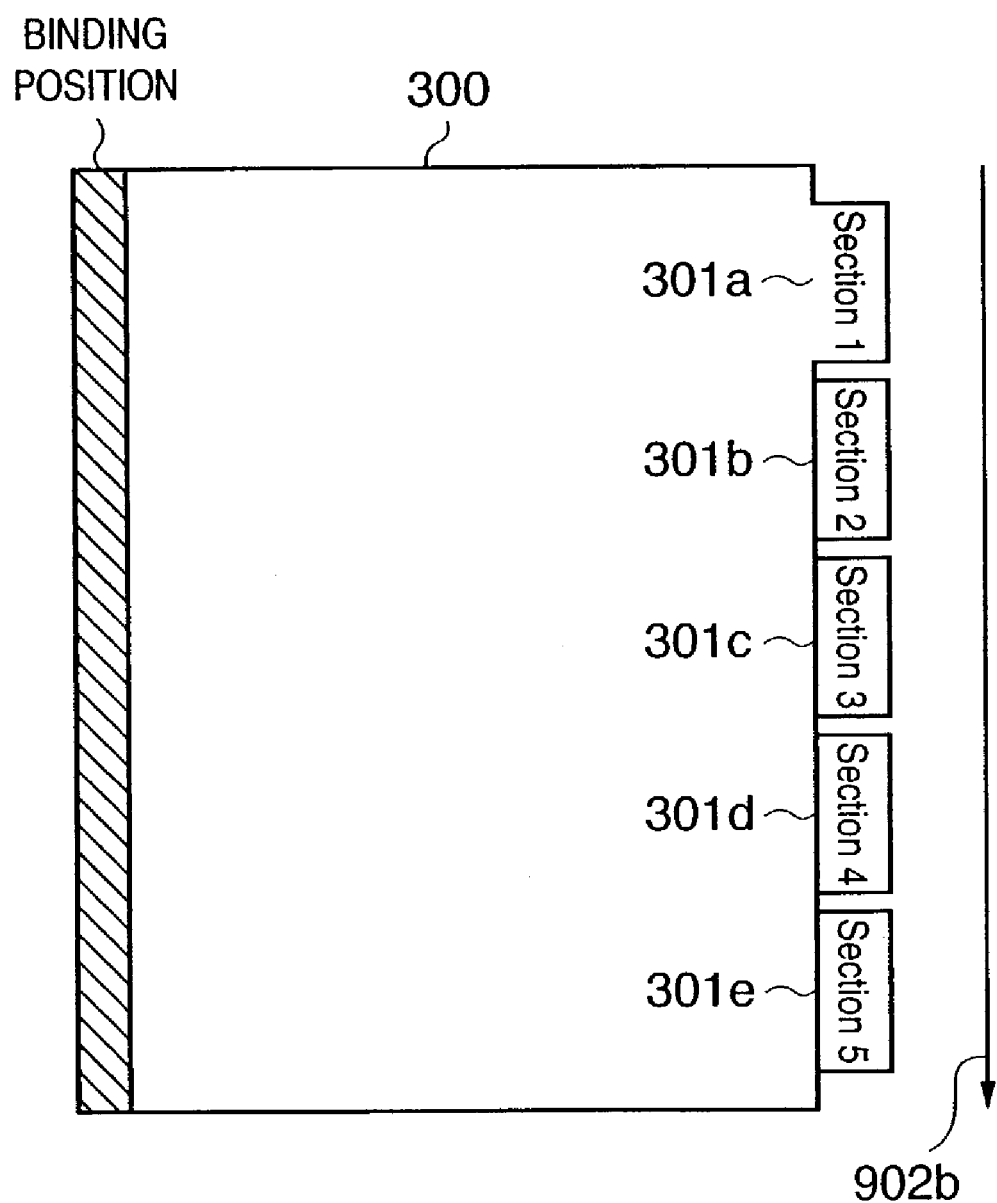
FIG. 11B is a view showing, for comparison, the order of index information on a tab sheet set to be inserted into a document that opens to right.

FIG. 11A and 11B are views showing the documents obtained by rearranging the documents shown in FIGS. 10B and 9B such that the index areas are located on the right side of the tab sheets.

FIG. 11A shows a case of "open to right" (FIG. 10B). FIG. 11B shows a case of "open to left" (FIG. 9B). The arrow on the right side of each of FIGS. 11A and 11B indicates the order of index information ("Section 1", "Section 2", "Section 3", "Section 4", and "Section 5").

In the case shown in FIG. 11A, the first index information "Section 1" is printed on a tab sheet 320a located at the lower end, i.e., the tab sheet fed last to the output device, and the fifth index information "Section 5" is printed on a tab sheet 320e located at the upper end, i.e., the tab sheet fed first to the output device.

Likewise, in the case shown in FIG. 11B, the first index information "Section 1" is printed on the tab sheet 301a located at the upper end, i.e., the tab sheet fed first to the output device, and the fifth index information "Section 5" is printed on the tab sheet 301e located at the lower end, i.e., the tab sheet fed last to the output device.

As described above, the order of index information must be changed depending on the opening direction of a document in which tab sheets are to be inserted. In step S801 in FIG. 8, this opening direction is designated.

The following description will be made on the assumption that the tab sheet set 300 is used.

When the user completes basic setting for the tab sheets in the tab portion basic setting window 600 (FIG. 6) in step S801, and selects "print position adjustment" 609, the flow advances to step S802.

In step S802, the user sets adjustment values for the print position of the index information ("horizontal detailed adjustment" 701 and "vertical detailed adjustment" 702) in the detailed print position adjustment window 700 (FIG. 7). Since the respective setting items have been described with reference to FIG. 7, a description thereof will be omitted.

If "print position adjustment" 609 in FIG. 6 is not selected in step S801, and detailed adjustment values for the print position of the index information ("horizontal detailed adjustment" 701 and "vertical detailed adjustment" 702) are not set by the user in the detailed print position adjustment window 700 in FIG. 7, it is regarded that values with "horizontal detailed adjustment" 701 and "vertical detailed adjustment" 702 are set to "0.0 mm".

When the press of one of the buttons 610 to 612 arranged at the lower end of the detailed print position adjustment window 700 (FIG. 7) is detected in step S802 or the press of one of the buttons 610 to 612 arranged at the lower end of the tab portion basic setting window 600 (FIG. 6) is detected in step S801, the flow advances to step S803.

It is checked in step S803 whether the button pressed in the detailed print position adjustment window 700 (FIG. 7) in step S802 is the "test printing" button 610. If the "test printing" button 610 is pressed, the flow advances to step S804. If the button pressed in the detailed print position adjustment window 700 (FIG. 7) is a button other than the "test printing" button 610, i.e., the "OK" button 611 or "cancel" button 612, the flow advances to step S806.

In step S804, a test printing job is created on the basis of the respective pieces of setting information, i.e., "tab sheet count" 601, "opening direction" 602, "width" 603 of each index area, "height" 605 of each index area, "spacing" 606 between index areas, "upper margin" 604, and "lower margin" 607 set in the tab portion basic setting window 600 in step S801, and "horizontal detailed adjustment" 701 and "vertical detailed adjustment" 702 set in the detailed print position adjustment window 700 in step S802. The flow then advances to step S805.

[Test Printing]

Test printing will be described below. Test printing is processing for obtaining reference adjustment amounts for the adjustment of the print position of index information before printing on tab sheets by performing test printing on an opaque sheet equal in size to the sheets of a document in which tab sheets are to be inserted.

A test printing job is constituted by all pieces of index information and data for printing guide lines on one opaque sheet so as to obtain reference adjustment amounts for the detailed adjustment of print positions. The test printing job data for the opaque sheet will be described in detail later.

In step S805, the test printing job data created in step S804 is output with respect to the test printing sheet (opaque sheet). The flow then returns to step S801.

When the user determines from the result of the test printing that there is no significant setting error (e.g., an error in "tab sheet count" 601 or an error in "opening direction" 602) in the contents set in the tab portion basic setting window 600 in step S801, and presses "print position adjustment" 609 indicating this, the flow advances to step S802.

[Procedure for Eye Measurement of Print Offset Amount Based on Test Printing Sheet (Opaque Sheet): FIG. 12]

Figure 12A:
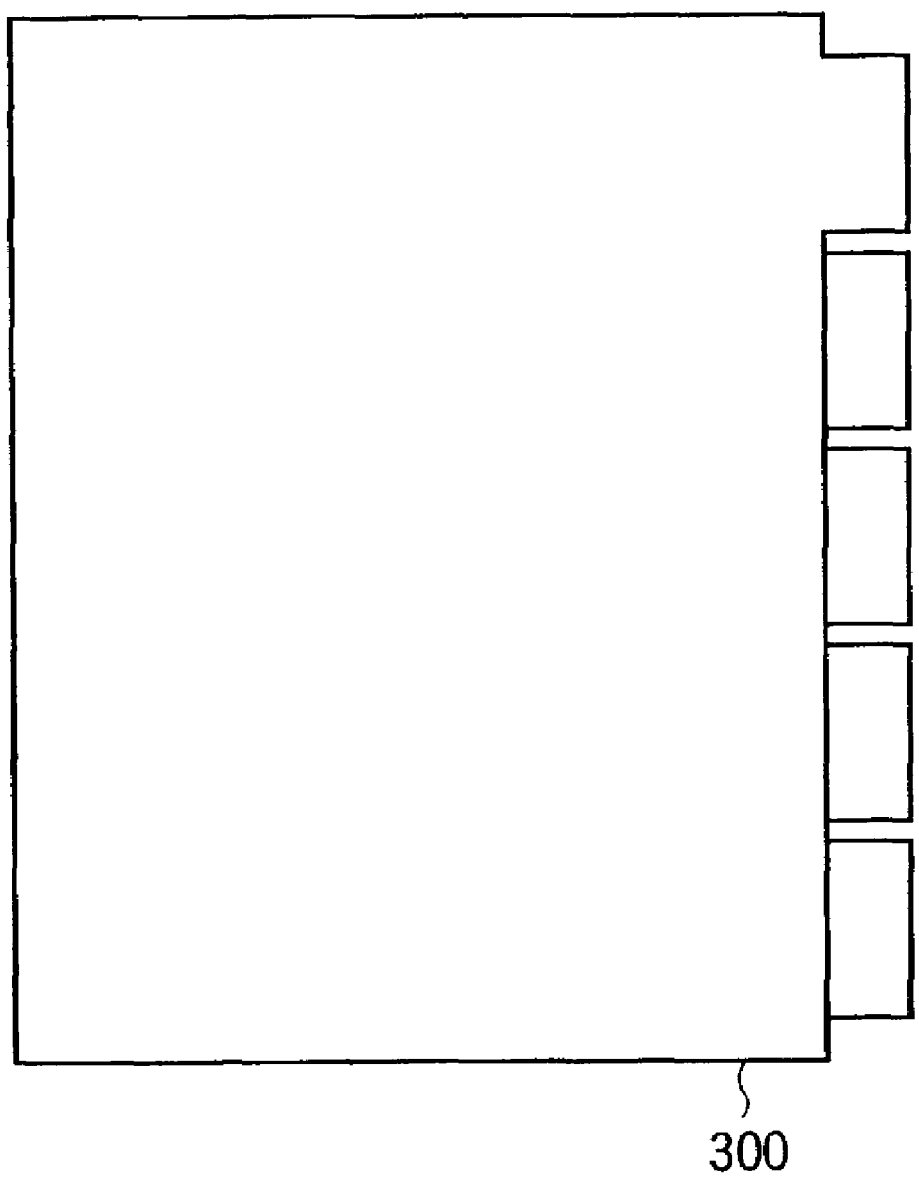
FIG. 12A is a view showing an example of a tab sheet set.
Figure 12B:
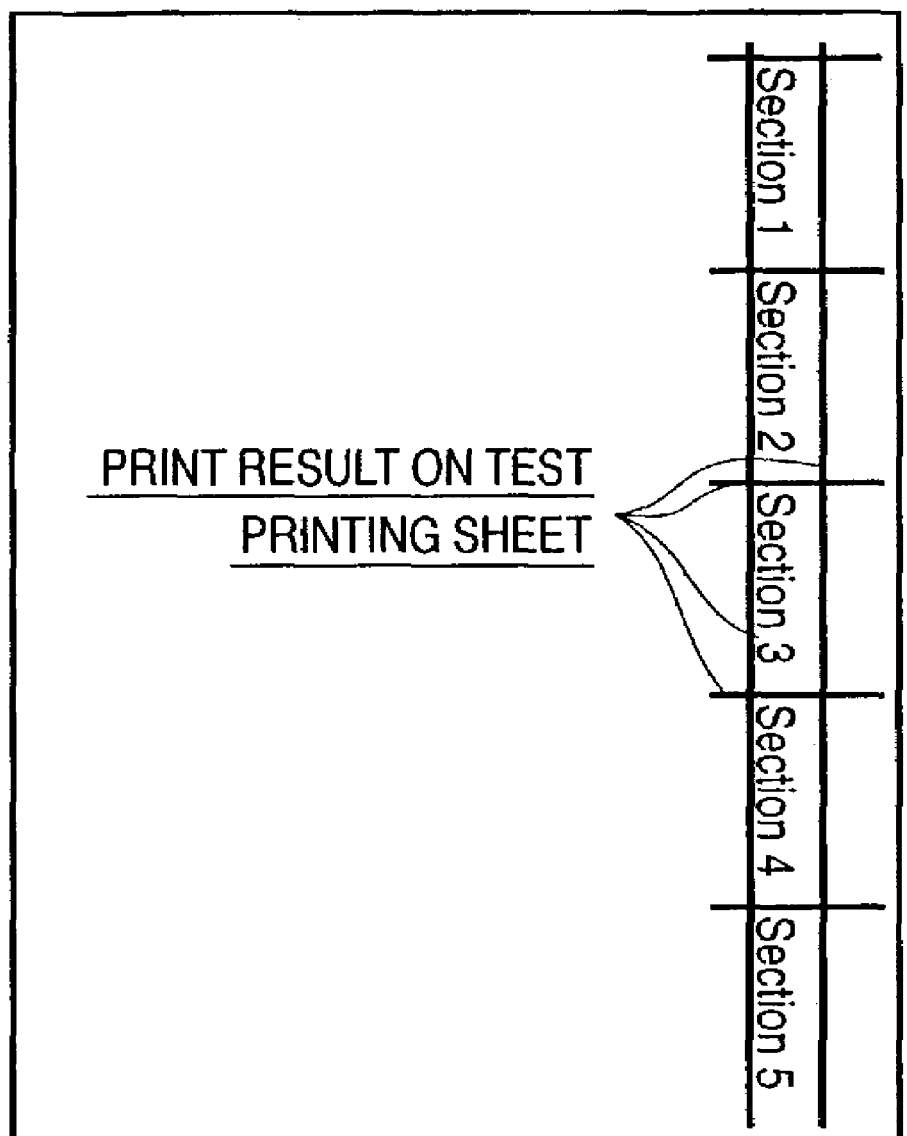
FIG. 12B is a view showing an example of a test printing sheet (opaque sheet) on which index information is printed.
Figure 12C:
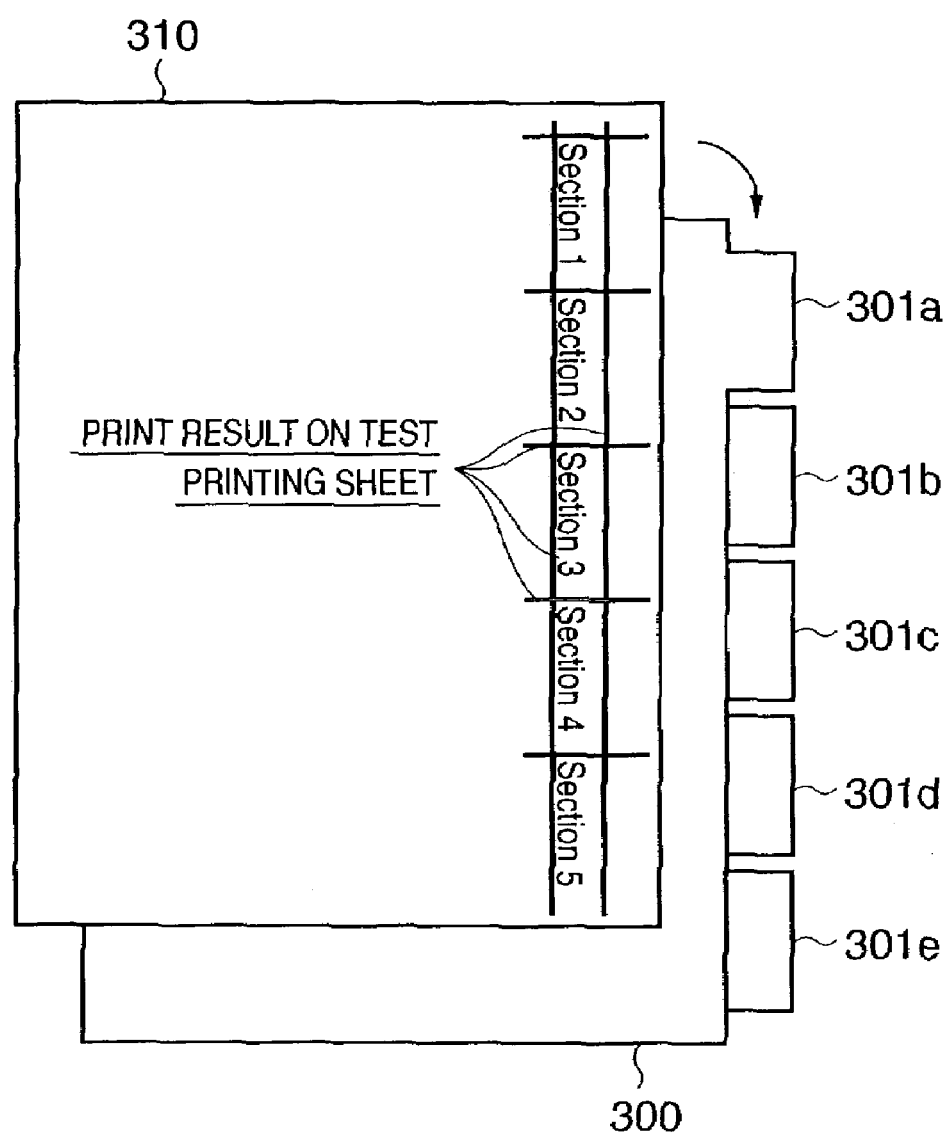
FIG. 12C is a view for explaining a method of superimposing the test printing sheet (opaque sheet) in FIG. 12A on a tab sheet set to check print offsets.

FIGS. 12A to 12C show the result of test printing on a test printing sheet 310 in step S805.

FIG. 12A shows the tab sheet set 300 on which the index information is to be printed. FIG. 12B shows all the pieces of index information printed on one test printing sheet (Opaque Sheet) 310 and the result obtained by outputting guide lines for obtaining reference adjustment amounts for the detailed adjustment of print positions. FIG. 12C shows a procedure by which the user performs eye measurement of print offset amounts in the vertical and horizontal directions by superimposing the test printing sheet (Opaque Sheet) 310, as reference adjustment amounts for the detailed adjustment of the print positions, on the tab sheet set 300 on which the index information is to be printed. The guide lines are printed on the basis of the information input in the tab portion basic setting window 600 for setting the position information of the tab portions and the like. This operation will be described in detail below.

Figure 13A:
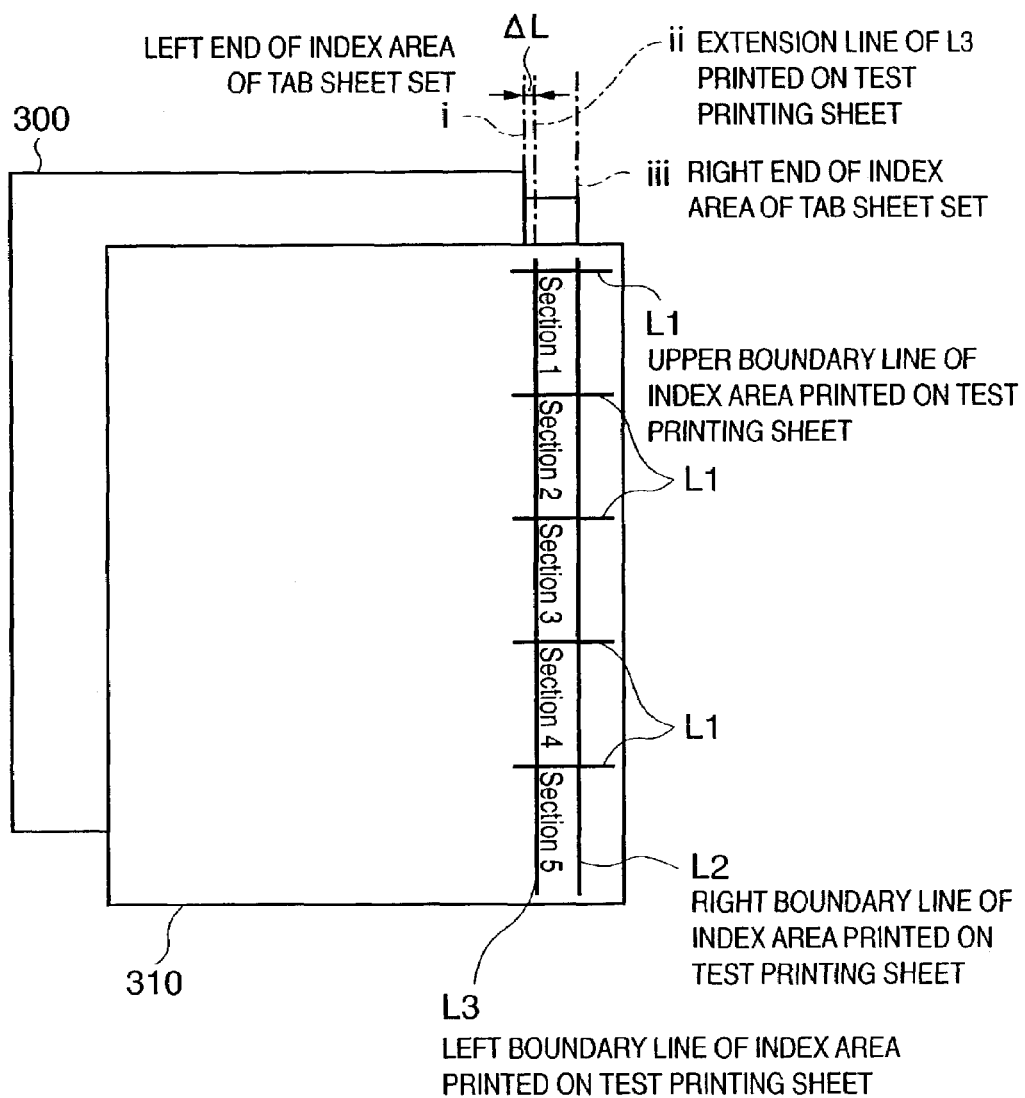
FIG. 13A is a view for explaining a method of measuring a horizontal print position offset amount ΔL of index information by superimposing a test printing sheet (opaque sheet) on a tab sheet set.

[Detailed Adjustment of Print Positions in Horizontal Direction: FIGS. 13A and 13B]

FIGS. 13A and 13B show a procedure for detailed adjustment of print positions in the horizontal direction.

Referring to FIG. 13A, a solid line (L1) indicates the upper boundary line of the index information printed on a tab portion (index area) of the test printing sheet 310. That is, referring to FIG. 13A, this solid line indicates the upper boundary line of the index information print area of the tab portion in which the index information "Section 1" is to be printed.

Likewise, solid lines (L1) indicate the upper boundary lines of the index information print areas in which the pieces of index information ""Section 2", "Section 3", "Section 4", and "Section 5" printed in the index areas of the test printing sheet 310 are to be printed.

Referring to FIG. 13A, a solid line (L2) indicates the right boundary line of the index information printed in the index areas of the test printing sheet 310, and a solid line (L3) indicates the left boundary line of the index information printed in the index areas of the test printing sheet 310.

Referring to FIG. 13A, the tab sheet set 300 is obtained by stacking tab sheets on which index information is to be printed. A broken line (i) indicates the left end of each index area of the tab sheet set 300, and a broken line (iii) indicates the right end of each index area of the tab sheet set 300.

Referring to FIG. 13A, eye measurement of a detailed adjustment amount for the print position in the horizontal direction is performed by the procedure shown in FIG. 13B. First of all, the tab sheet set 300 and test printing sheet 310 are superimposed on each other such that the solid line (L2) (the right boundary line of each index area printed on the test printing sheet 310) coincides with the broken line (iii) (the right end of each index area of the tab sheet set 300). The user then performs eye measurement of an offset amount (ΔL) which is the distance between the broken line (i) (the left end of each index area of the tab sheet set 300) and a broken line (ii) indicating an extension line of the solid line (L3) on the test printing sheet 310.

FIG. 13A shows a case wherein the broken line (ii) is located between the broken line (i) and the broken line (iii). If, for example, the broken line (ii) is located on the left side of the broken line (i), print omissions of the index information may occur. Such a situation occurs because a value larger than the actual width of each index area is set when the width of each index area ("width" 603) is designated in the tab portion basic setting window 600 (FIG. 6) in step S801. In this case, the user performs eye measurement of an offset amount (ΔL), which is the distance between the broken line (ii) and the broken line (i), and decreases the width of each index area ("width" 603) set in the tab portion basic setting window 600 in step S801 by the adjustment amount obtained by eye measurement. Alternatively, the user decreases the value set with "horizontal detailed adjustment" 701 in the detailed print position adjustment window 700 in step S802 by the adjustment amount obtained by eye measurement, and shifts the index information print area, i.e., the print position of the index print data, to the left.

Even if there is no possibility of print omissions, i.e., the broken line (ii) is located between the broken line (iii) and the broken line (i), the user may horizontally shift each index information print area to adjust the appearance by increasing/decreasing the setting with "horizontal detailed adjustment" 701 in the detailed print position adjustment window 700 (FIG. 7).

FIGS. 13A and 13B show the case wherein the tab sheet set 300 and test printing sheet 310 are superimposed on each other such that the solid line (L2) (the right boundary line of each index area printed on the test printing sheet 310) coincides with the broken line (iii) (the right end of each index area of the tab sheet set 300). However, the user may superimpose the tab sheet set 300 and test printing sheet 310 so as to make the solid line (L3) (the left boundary line of each index area printed on the test printing sheet 310) coincide with the broken line (i) (the left end of each index area of the tab sheet set 300), and then perform detailed adjustment by performing eye measurement of an offset amount, which is the distance between an extension line of the solid line (L2) on the test printing sheet 310 and the broken line (iii) (the right end of the index area of the tab sheet set 300).

Figure 14A:
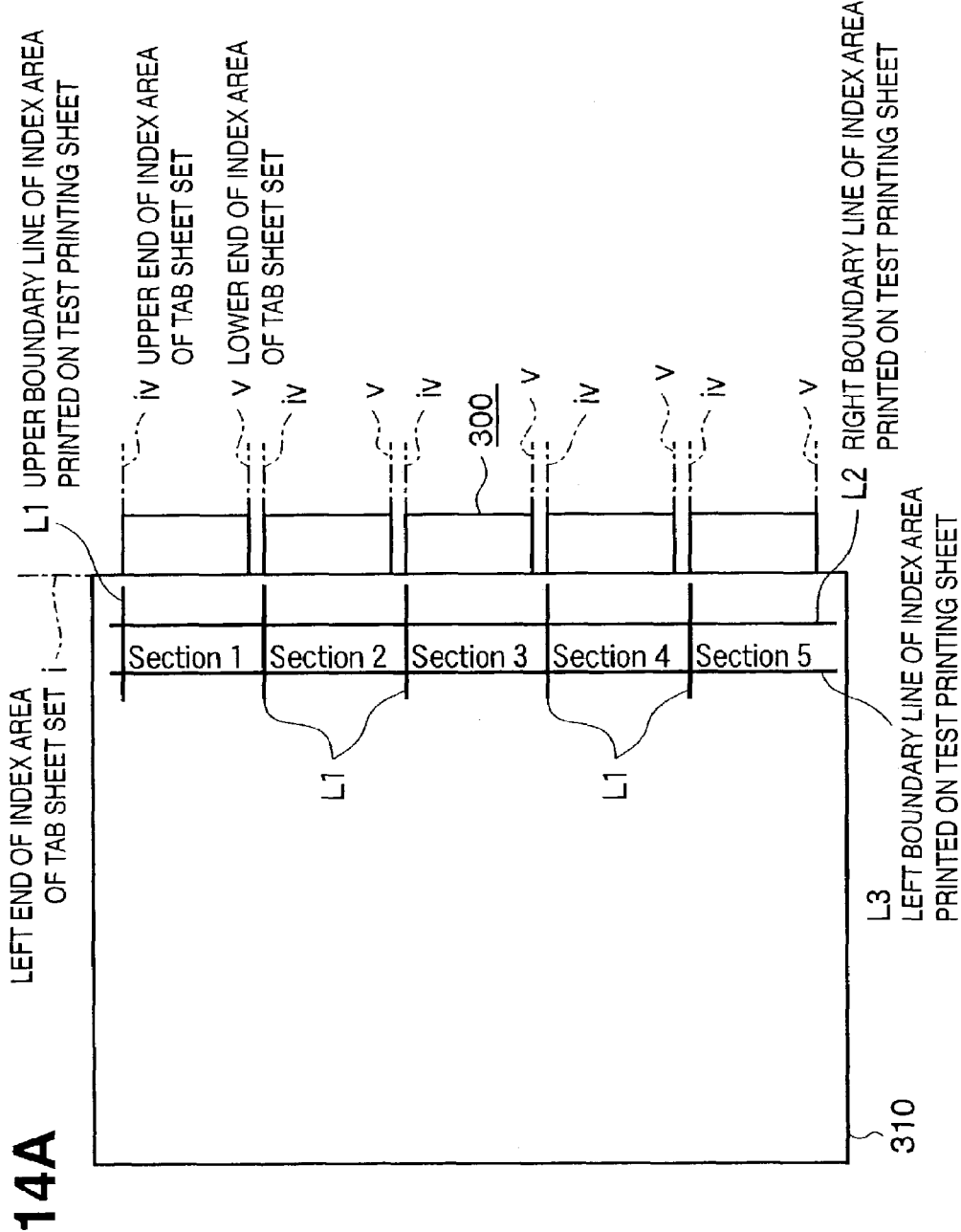
FIG. 14A is a view for explaining a method of measuring a vertical print position offset amount ΔL of index information by superimposing a test printing sheet (opaque) on a tab sheet set.

[Detailed Adjustment for Print Position in Vertical Direction: FIGS. 14A and 14B]

FIGS. 14A and 14B show a procedure for detailed adjustment for a print position in the vertical direction.

As in FIG. 13A, a solid line (L1) in FIG. 14A indicates the upper boundary line of index information printed in an index area of the test printing sheet 310. That is, referring to FIG. 13A, this solid line indicates the upper boundary line of the index information print area in which the index information "Section 1" is to be printed.

Likewise, solid lines (L1) indicate the upper boundary lines of the index information print areas in which the pieces of index information "Section 2", "Section 3", "Section 4", and "Section 5" printed in the index areas of the test printing sheet 310 are to be printed.

Referring to FIG. 14A, a solid line (L2) indicates the right boundary line of the index information printed in each index area of the test printing sheet 310, and a solid line (L3) indicates the left boundary line of the index information printed in each index area of the test printing sheet 310.

Referring to FIG. 14A, the tab sheet set 300 is obtained by stacking tab sheets before printing of index information. A broken line (i) indicates the left end of each index area of the tab sheet set 300, a broken line (iv) indicates the upper end of an index area of the tab sheet set 300, and a broken line (v) indicates the lower end of an index area of the tab sheet set 300.

Referring to FIG. 14A, eye measurement of a detailed adjustment amount for a print position in the vertical direction is performed by the procedure shown in FIG. 14B. First of all, the tab sheet set 300 and test printing sheet 310 are superimposed on each other such that the upper end of the test printing sheet 310 coincides with the upper end of the tab sheet set 300, and the right end of the test printing sheet coincides with the broken line (i) (the left end of each index area of the tab sheet set 300). The user then performs eye measurement of an offset amount (ΔL), which is the distance between the solid line (L1) on the test printing sheet 310 and the broken line (iv) (the upper end of an index area of the tab sheet set 300).

FIG. 14A shows a case wherein the solid line (L1) and broken line (iv) are almost located on an extension line. If, however, the solid line (L1) does not coincide with the broken line (iv), print omissions of index information may occur. In this case, the user perform eye measurement of an offset amount (ΔL), which is the distance between the solid line L1 and the broken line iv), and decreases/decreases the setting made with "vertical detailed adjustment" 702 in the detailed print position adjustment window 700 (FIG. 7) in step S802 by the adjustment amount obtained by eye measurement, thereby vertically shifting each index information print area, i.e., the print position of the index print data.

Even if there is no possibility of print omissions, the user may vertically shift each index information print area to adjust the appearance by increasing/decreasing the setting with "vertical detailed adjustment" 702 in the detailed print position adjustment window 700 (FIG. 7) in step S802.

The user may make detailed adjustment setting for the print position of the index information in steps S801 and S802 from the test print result, and then designate actual tab sheet printing processing on the tab sheet set 300. In this case, when the user presses the "OK" button 611 located at the lower end of the tab portion basic setting window 600 (FIG. 6) or detailed print position adjustment window 700 (FIG. 7), the flow advances to step S806 through step S803.

The user may perform test printing again after making detailed adjustment setting for the print position of the index information from the test print result in steps S801 and S802. In this case, the user presses the "test printing" button 610 located at the lower end of the tab portion basic setting window 600 (FIG. 6) or detailed print position adjustment window 700 (FIG. 7).

After sufficiently making detailed adjustment setting for the print position of the index information on the basis of the test print result by repeating steps S801, S802, S803, S804, and S805 in this manner, the user. may designate actual tab sheet printing processing on the tab sheet set. In this case, the user presses the "OK" button 611 located at the lower end of the tab portion basic setting window 600 (FIG. 6) or detailed print position adjustment window 700 (FIG. 7), and the flow advances to step S806 through step S803.

If it is determined in step S806 that the button pressed in the tab portion basic setting window 600 (FIG. 6) in step S801 or in the detailed print position adjustment window 700 (FIG. 7) in step S802 is the "OK" button 611, the flow advances to step S807. If this button is the "cancel" button 612, print position adjustment processing of the index information is terminated.

In step S807, a job for actual index printing on the tab sheet set 300 is created on the basis of the basic settings for the tab sheets which are made in step S801 ("tab sheet count" 601, "opening direction" 602, "width" 603 of each index area, "height" 605 of each index area, "spacing" 606 between index areas, "upper margin" 604, and "lower margin" 607) and the detailed settings for the print position which are made in step S802 ("horizontal detailed adjustment" 701 and "vertical detailed adjustment" 702). The flow then advances to step S808.

In step S808, the index information print job data created in step S807 is output with respect to the actual tab sheet set 300. The print position adjustment processing of the index information is then terminated.

According to this embodiment, first of all, positions at which pieces of index information (Section 1 to Section 5) are to be printed on the respective tab portions of the tab sheet set 300 (constituted by, e.g., five sheets) are set. The pieces of index information are then printed on one test printing sheet 310 (opaque sheet), together with guide lines (L1 to L3) for the eye measurement of print positions which are the boundary lines of the respective index areas, on the basis of these setting values.

The test printing sheet 310 is then superimposed on the tab sheet set 300 (constituted by, e.g., five sheets), and a print offset amount of the print position in the horizontal direction is measured.

The setting values for the index information (Section 1 to Section 5) to be printed on the respective tab portions are reset (detailed adjustment) by using the measured print offset amount. The pieces of index information (Section 1 to Section 5) can be accurately printed on the respective tab portions on the tab sheet set 300 on the basis of the resetting values.

The problem of wasting a tab sheet set due to print offsets can therefore be solved by allowing test printing and detailed adjustment processing of the print position of index information before printing of the index information on the actual tab sheet set. This produces a great effect for tab sheets, in particular, which are expensive compared with plain paper.

Second Embodiment

Outline of Second Embodiment

In the first embodiment, position information of tab portions and information about print areas in which index information is to be printed are set, and before the index information is printed on the tab portion of each tab sheet on the basis of the print area information, all pieces of index information to be printed on the respective tab sheets and boundary lines indicating the respective index areas (guide lines for eye measurement of print positions) are printed in advance on one test printing sheet (opaque sheet such as plain sheet). The user then performs eye measurement of a print offset width that occurs when printing is done on the actual tab sheet set by superimposing the test printing sheet on the tab sheets. The user adjusts (resets) the print position of each index information by using the eye measurement value.

The second embodiment will exemplify a method of adjusting (resetting) the print position of each index information more accurately by performing test printing using a transparent test printing sheet such as an OHP sheet instead of the test printing sheet used in the first embodiment.

A transparent test printing sheet is superimposed on tab sheets. A print offset amount which occurs when printing is performed on the actual tab sheet set is then accurately measured with the scale marks printed on the transparent test printing sheet. The print position of each index information is adjusted (reset) more accurately by using the measurement value of the print offset amount, thereby printing the index information more accurately. This method will be described below.

A printing system according to the second embodiment has the same arrangement as that of the printing system according to the first embodiment described above except for a test printing sheet (a transparent sheet such as an OHP sheet). The description made with reference to FIGS. 1 to 11 in the first embodiment is common to the second embodiment to be described below, and hence a description thereof will be omitted. Only the method of measuring a print offset amount by using a test printing sheet, which differs from that in the first embodiment, will be described below with reference to the flow chart of FIG. 8.

[Procedure for Measuring Print Offset Amount by Using Test Printing Sheet: FIGS. 15A to 16B]

Figure 15A:
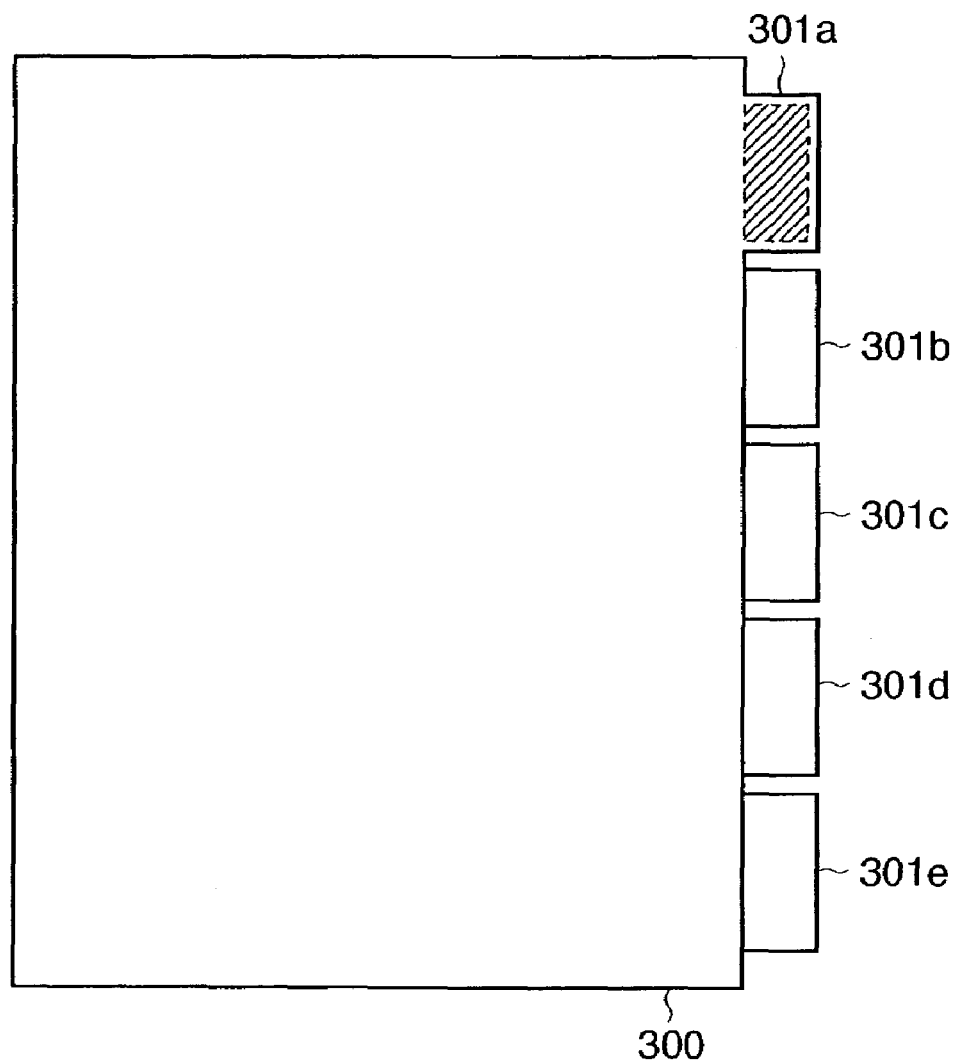
FIG. 15A is a view showing an example of a tab sheet set.
Figure 15B:
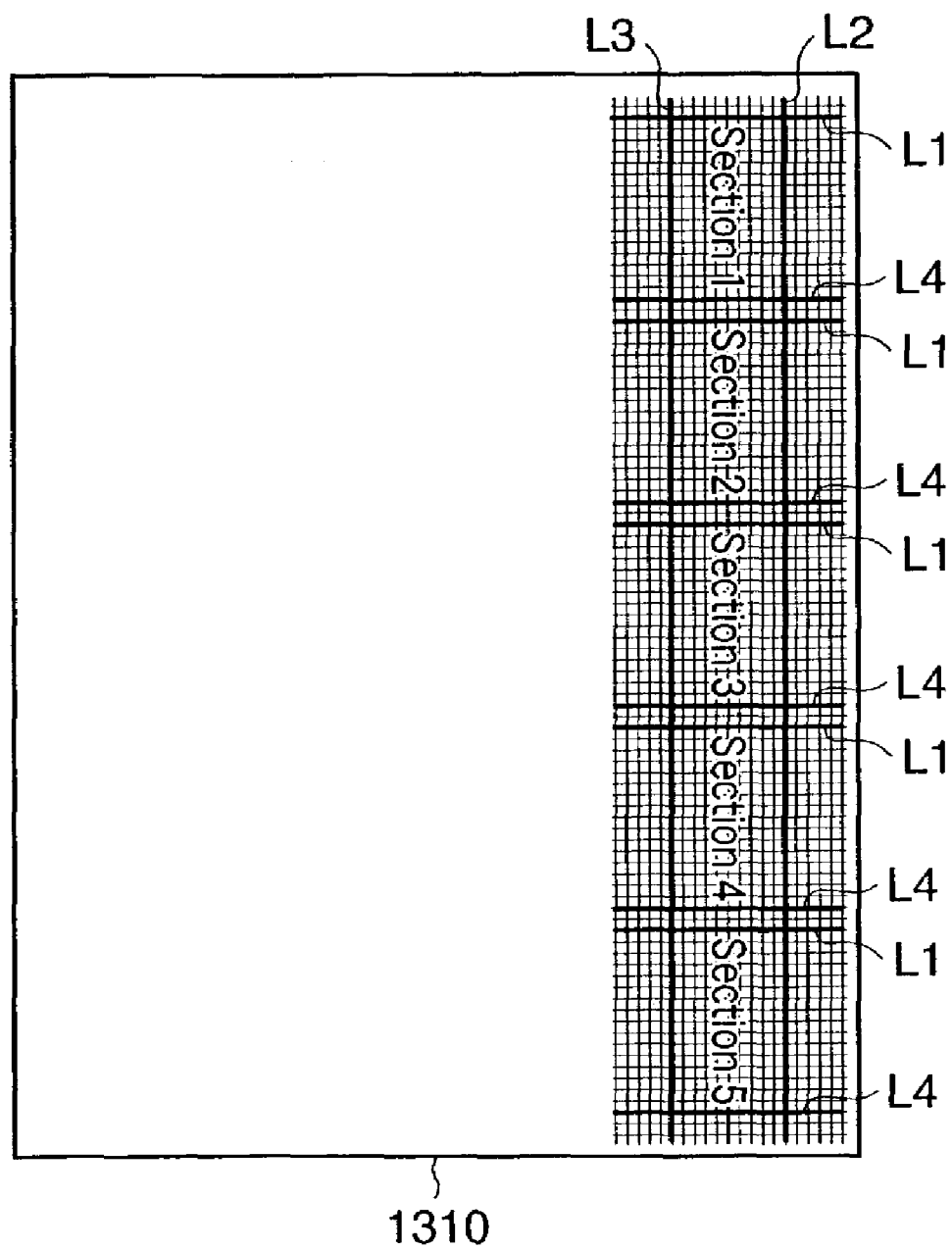
FIG. 15B is a view showing an example of a test printing sheet (transparent sheet) on which index information is printed.
Figure 16A:
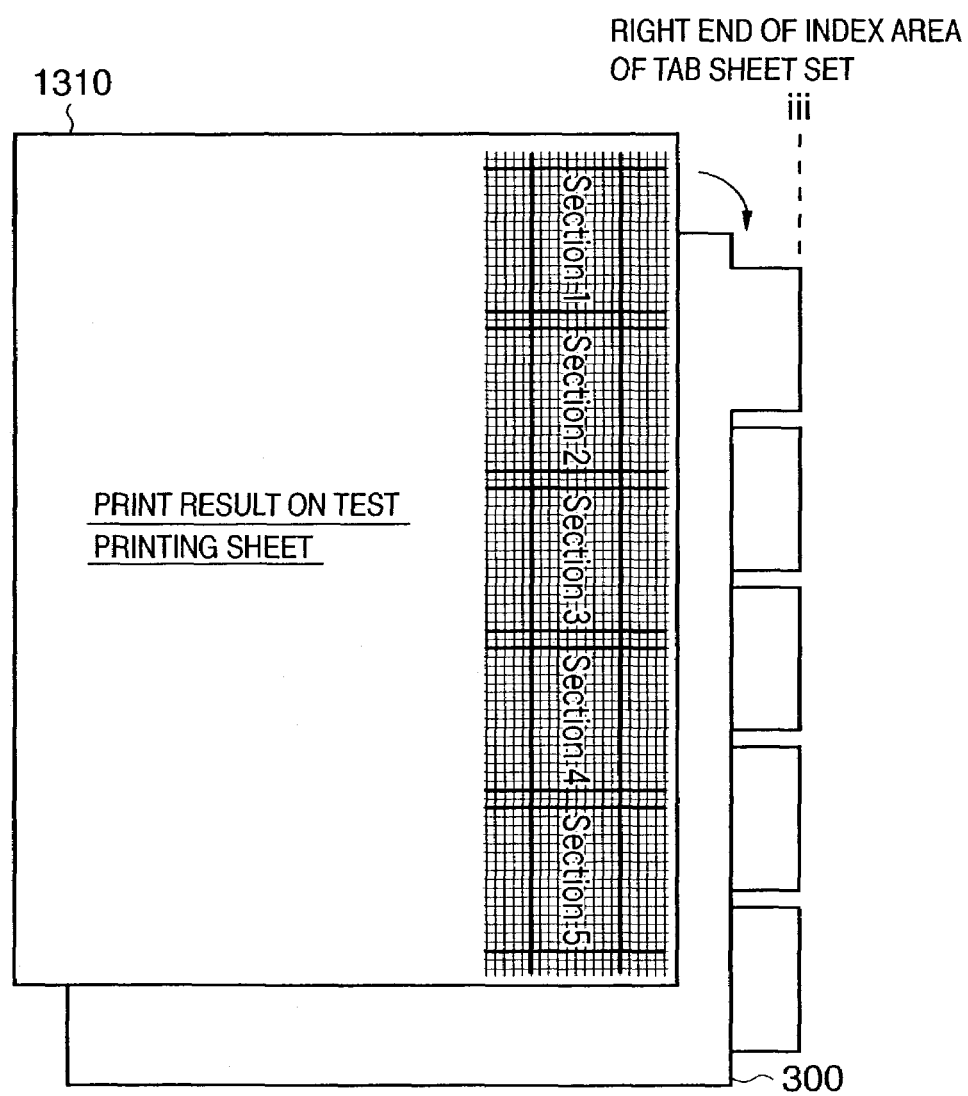
FIG. 16A is a view showing an example of a procedure for superimposing on a tab sheet set a test printing sheet (transparent sheet) on which index information is printed.
Figure 16B:
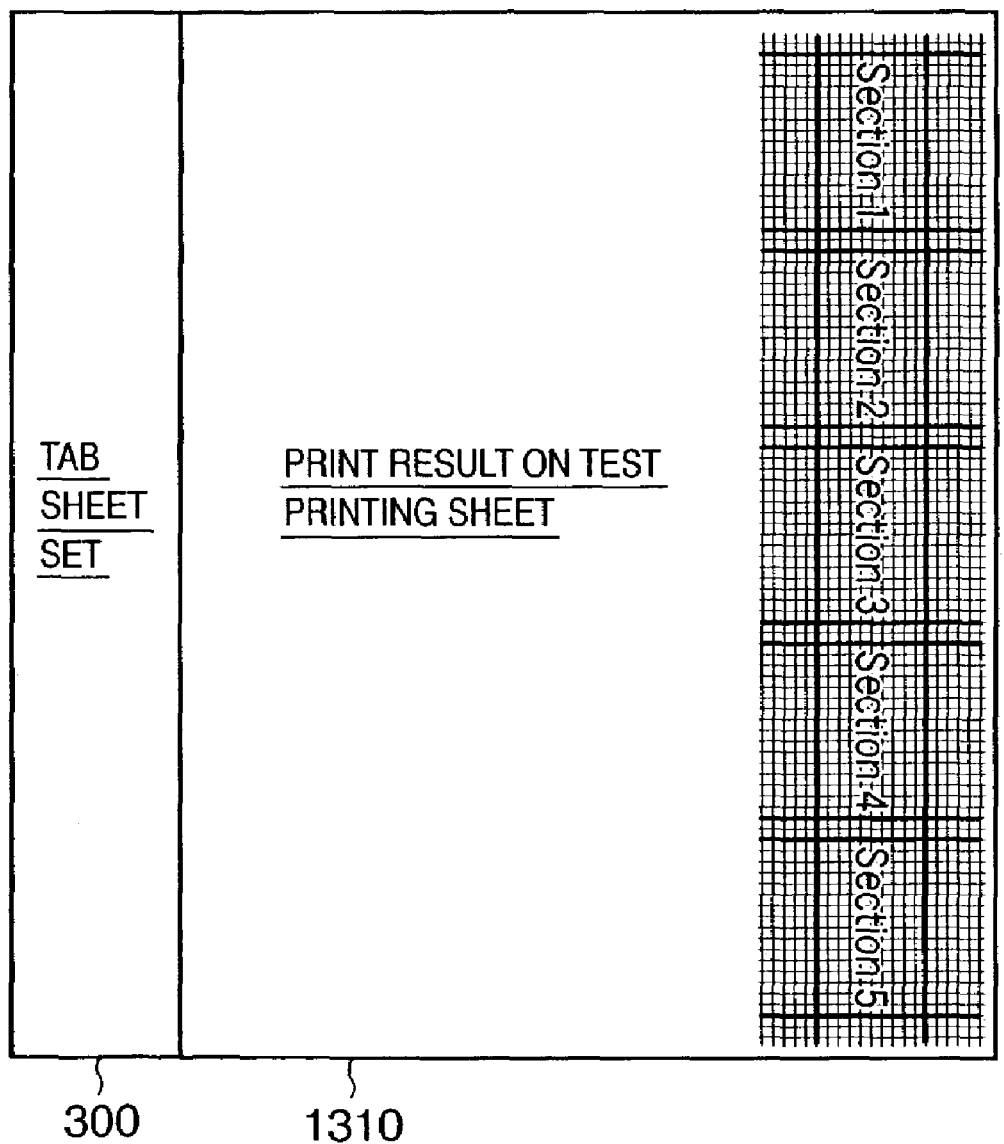
FIG. 16B is a view showing an example of a procedure for superimposing on a tab sheet set a test printing sheet (transparent sheet) on which index information is printed.

FIGS. 15A and 15B show an example of the result of test printing on a test printing sheet (a transparent sheet such as an OHP sheet) 1310 in step S805 in FIG. 8.

FIG. 15A shows a tab sheet set 300 on which index information is to be printed. FIG. 15B shows all the pieces of index information printed on one test printing sheet 1310 (OHP sheet) and the result obtained by outputting guide lines (L1 to L4) for obtaining reference adjustment amounts for the detailed adjustment of print positions.

In obtaining reference detailed adjustment amounts for a print position, adjustment amounts (print offset amounts) in the vertical and horizontal directions are measured by superimposing the test printing sheet 1310 on the tab sheet set 300 on which the index information is to be printed.

Figure 17A:
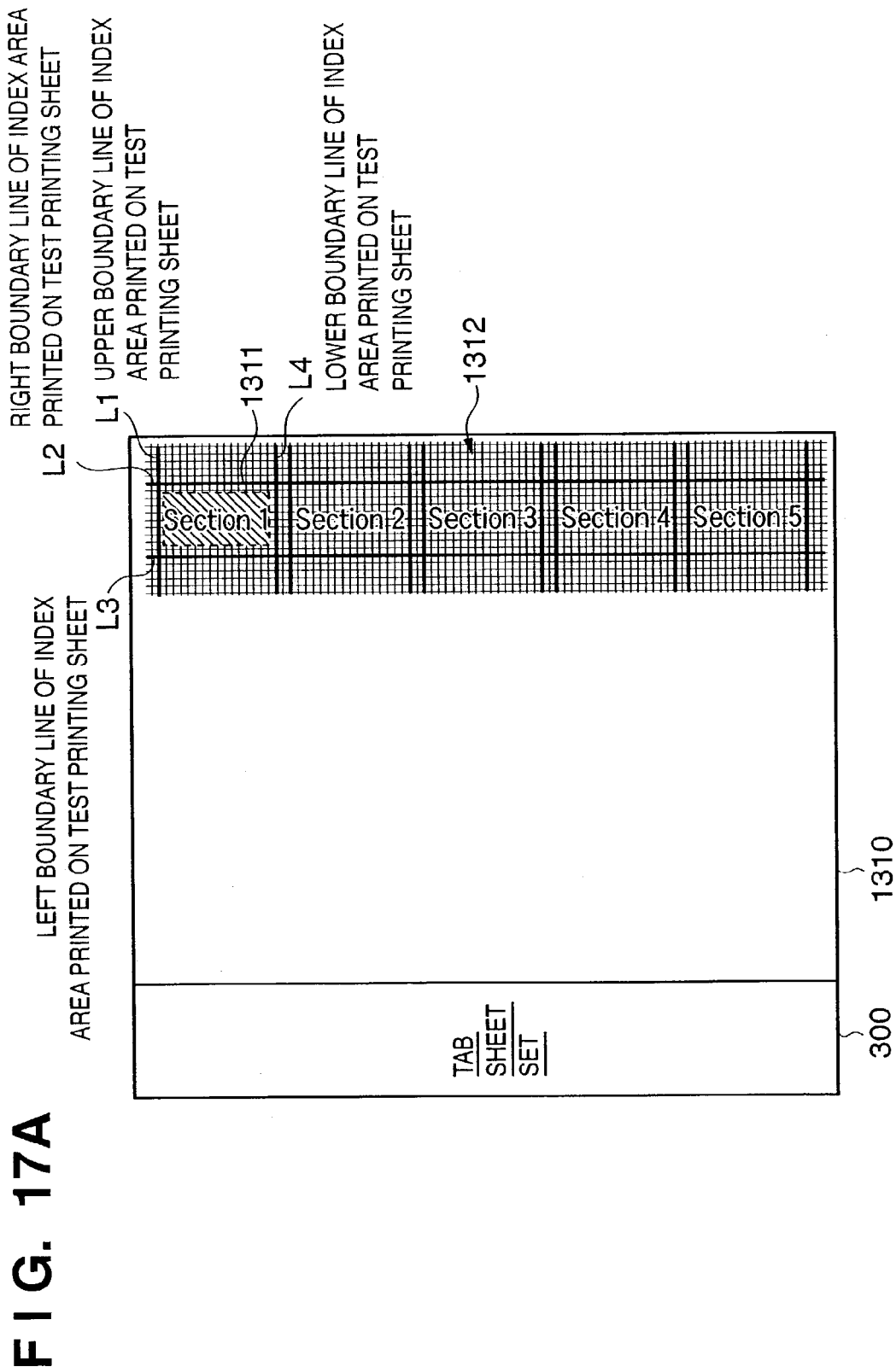
FIG. 17A is a view for explaining a method of measuring vertical and horizontal print position offset amounts ΔL of index information by superimposing a test printing sheet (transparent sheet) on a tab sheet set.

FIG. 17A shows a procedure for performing detailed adjustment (measurement of an print offset amount) of the print position in the horizontal direction.

A solid line (L1) in FIG. 17A indicates the upper boundary line of an index information print area as an index area printed on the test printing sheet 1310 at the upper end. In the case shown in FIG. 17A, this line indicates the upper boundary line of the index information print area in which the index information "Section 1" is printed.

Likewise, upper boundary lines of the index information print areas in which the pieces of index information "Section 2", "Section 3", "Section 4", and "Section 5" are printed are also printed on the same test printing sheet 1310.

A solid line (L4) in FIG. 17A indicates the lower boundary line of the index information print area as the index area printed on the test printing sheet 1310 at the upper end (tab portion 301a). In the case shown in FIG. 17A, this line indicates the lower boundary line of the index information print area in which the index information "Section 1" is printed.

Likewise, lower boundary lines of the index information print areas in which the pieces of index information "Section 2", "Section 3", "Section 4", and "Section 5" are printed are also printed on the same test printing sheet 1310.

A solid line (L3) in FIG. 17A indicates the left boundary line of each index area printed on the test printing sheet 1310. A solid line (L2) in FIG. 17A indicates the right boundary line of each index information print area printed on the test printing sheet 1310.

Note that a rectangular area 1311 enclosed with the solid lines (L1, L2, L3, and L4) in FIG. 17A indicates the area in which the index information "Section 1" in FIG. 17A is printed. Likewise, the respective rectangular areas enclosing the pieces of index information ""Section 2", "Section 3", "Section 4", and "Section 5" also indicate the areas in which the respective pieces of index information are printed.

As shown in FIG. 17A, detailed adjustment value measurement scale marks 1312 for measuring an adjustment amount for a print position are printed on the test printing sheet 1310 so as to cover all the index areas. In measuring a detailed adjustment amount for the print position of index information, the tab sheet set 300 on which the index information is to be actually printed is superimposed on the test printing sheet such that the right end (iii) (see FIG. 6A) of each index area and upper end of the tab sheet set 300 completely coincide with the solid line (L2) and upper end of the tab sheet set 300, respectively (FIG. 17A). In this case, since the test printing sheet 1310 is a transparent sheet such as an OHP sheet, the user can perfectly check the shape of the tab sheet set 300, which is stacked below, through the surface of the transparent sheet.

Figure 17B:
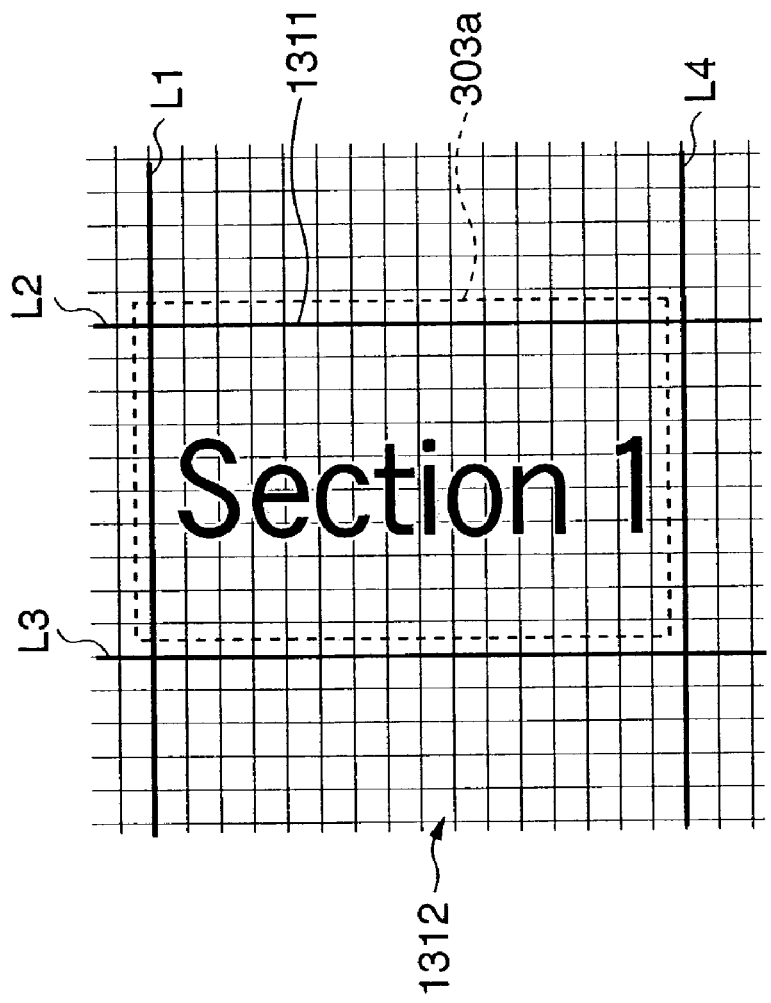
FIG. 17B is an enlarged view of a portion in FIG. 17A.

FIG. 17B shows a method of measuring adjustment amounts for an index information print area. Solid lines (L1 to L4) in FIG. 17B are identical to those in FIG. 17A, and the rectangular area 1311 enclosed with the solid lines (L1, L2, L3, and L4) in FIG. 17B indicates an area in which the index information "Section 1" in FIG. 17B is printed.

The broken line in FIG. 17B indicates the contour of an index area 303a at the upper end (tab portion 301a) of the tab sheet set 300 which can be seen through the surface of the transparent test printing sheet 1310 such as an OHP sheet.

In measuring adjustment amounts for the index information print area, the offset amounts between the contour of the index area 303a and the rectangular area 1311 enclosed with the solid lines (L1, L2, L3, and L4) in FIG. 17B are checked, and offset amounts in the vertical and horizontal directions are measured with the detailed adjustment value measurement scale marks 1312 printed on the test printing sheet 1310.

In the case shown in FIG. 17B, the solid line rectangular area 1311 is shifted from the broken line index area 303a by about one scale mark leftward and downward each. One scale mark of the guide pattern shown as an example in FIG. 17B corresponds to a distance of 1.0 mm. The reason why the rectangular area 1311 is shifted leftward by about one scale mark is that the width of each index area ("width" 603) set in a tab portion basic setting window 600 (FIG. 6) in step S801 is larger than the actual width of the index area. In this case, the user may shift the index information print area by 1.0 mm to the left by decreasing the width of each index area ("width" 603) set in the tab portion basic setting window 600 (FIG. 6) in step S801 by 1.0 mm, or by decreasing the detailed adjustment setting in the horizontal direction in the detailed print position adjustment window (FIG. 7) in step S802 by 1.0 mm.

The user therefore may shift the index information print area upward by 1.0 mm by decreasing the vertical detailed adjustment setting made in the detailed print position adjustment window (FIG. 7) by 1.0 mm in step S802. Assume that there is no possibility of print omissions, i.e., the areas in which the index information "Section 1" shown in FIG. 17B and index information (not shown) are to be printed are shown, and the pieces of index information "Section 2", "Section 3", "Section 4", and "Section 5" in FIG. 17B fit in the respective index areas of the tab sheets on which the respective pieces of index information are to be printed. Even in this case, the user may shift each index information print area vertically and horizontally to adjust the appearance by increasing/decreasing the detailed adjustment settings in the vertical and horizontal directions which are made in the detailed print position adjustment window (FIG. 7) in step S802.

The user may designate tab sheet printing processing for the tab sheet set after making detailed adjustment settings for the print position of the index information in steps S801 and S802. In this case, when the user presses an "OK" button 611 located at the lower end of the tab portion basic setting window (FIG. 6) or detailed print position adjustment window (FIG. 7), the flow advances to step S806 through step S803.

The user may also perform detailed adjustment of the print position of the index information in steps S801 and S801 from the test print result, and then perform test printing again.

In this case, the user presses a "test printing" button 610 located at the lower end of the tab portion basic setting window (FIG. 6) or detailed print position adjustment window (FIG. 7). After adjustment setting for the print position of the index information is sufficiently made from the test print result by repeating steps S801, S802, S803, S804, and S805 in this manner, the user may designate actual tab sheet printing processing for the tab sheet set. In this case, when the user presses the "OK" button 611 located at the lower end of the tab portion basic setting window (FIG. 6) or detailed print position adjustment window (FIG. 7), the flow advances to step S860 through step S803.

If it is determined in step S806 that the button pressed in the tab portion basic setting window (FIG. 6) in step S801 or in the detailed print position adjustment window (FIG. 7) in step S802 is the "OK" button 611, the flow advances to step S807. If this button is a "cancel" button 612, the print position adjustment processing for the index information is terminated.

In step S807, a job for actual index printing on the tab sheet set 300 is created on the basis of setting information including the tab sheet basic settings made in step S801 ("tab sheet count" 601, "opening direction" 602, "width" 603 of each index area, "height" 605 of each index area, "spacing" 606 between index areas, "upper margin" 604, and "lower margin" 607) and detailed print position adjustment settings made in step S802 ("horizontal detailed adjustment" 701 and "vertical detailed adjustment" 702). The flow then advances to step S808.

In step S808, the index information print job data created in step S807 is output to the tab sheet set 300. Thereafter, the print position adjustment processing for the index information is terminated.

According to this embodiment, in setting the print position of index information with respect to the index area of each tab sheet, offset widths that occur when printing is performed on an actual tab sheet set can be measured from the result of test printing operation of printing all pieces of index information on a single transparent sheet such as an OHP sheet, together with guide lines for eye measurement of print position adjustment amounts, and the eye measurement values can be reset as adjustment values for the print position of each index information. Therefore, detailed adjustment processing for test printing and the print position of each index information can be performed before the index information is printed on an actual tab sheet set. This makes it possible to solve the problem of wasting a tab sheet set due to print offsets. This produces a great effect for tab sheets, in particular, which are expensive compared with plain paper.

Third Embodiment

Outline of Third Embodiment

The third embodiment will exemplify the method of adjusting (resetting) the print position of index information more accurately by setting a print position for each index information instead of performing detailed adjustment setting for the print position of overall index information as in the first and second embodiments.

That is, a method of printing index information more accurately by allowing print position adjustment of the tab portion (index area) of each tab sheet constituting a tab sheet set will be described below.

The arrangement of a printing system according to the third embodiment is the same as that of the printing system according to the first embodiment except for a print position adjustment window. In addition, this system can be used regardless of the type of test printing sheet (opaque or transparent sheet), and hence is identical to the printing system according to the second embodiment described above. Since the contents described in the first embodiment with reference to FIGS. 1 to 6 and FIGS. 8 to 11B and the contents described in the second embodiment with reference to FIGS. 12A to 17B are common to the third embodiment to be described below, a description thereof will be omitted. Only a method of adjusting a print position for the index area of each tab sheet by using a detailed print position adjustment window, which differs from those in the first and second embodiments, will be described with reference to the detailed print position adjustment window shown in FIG. 18.

Figure 18:
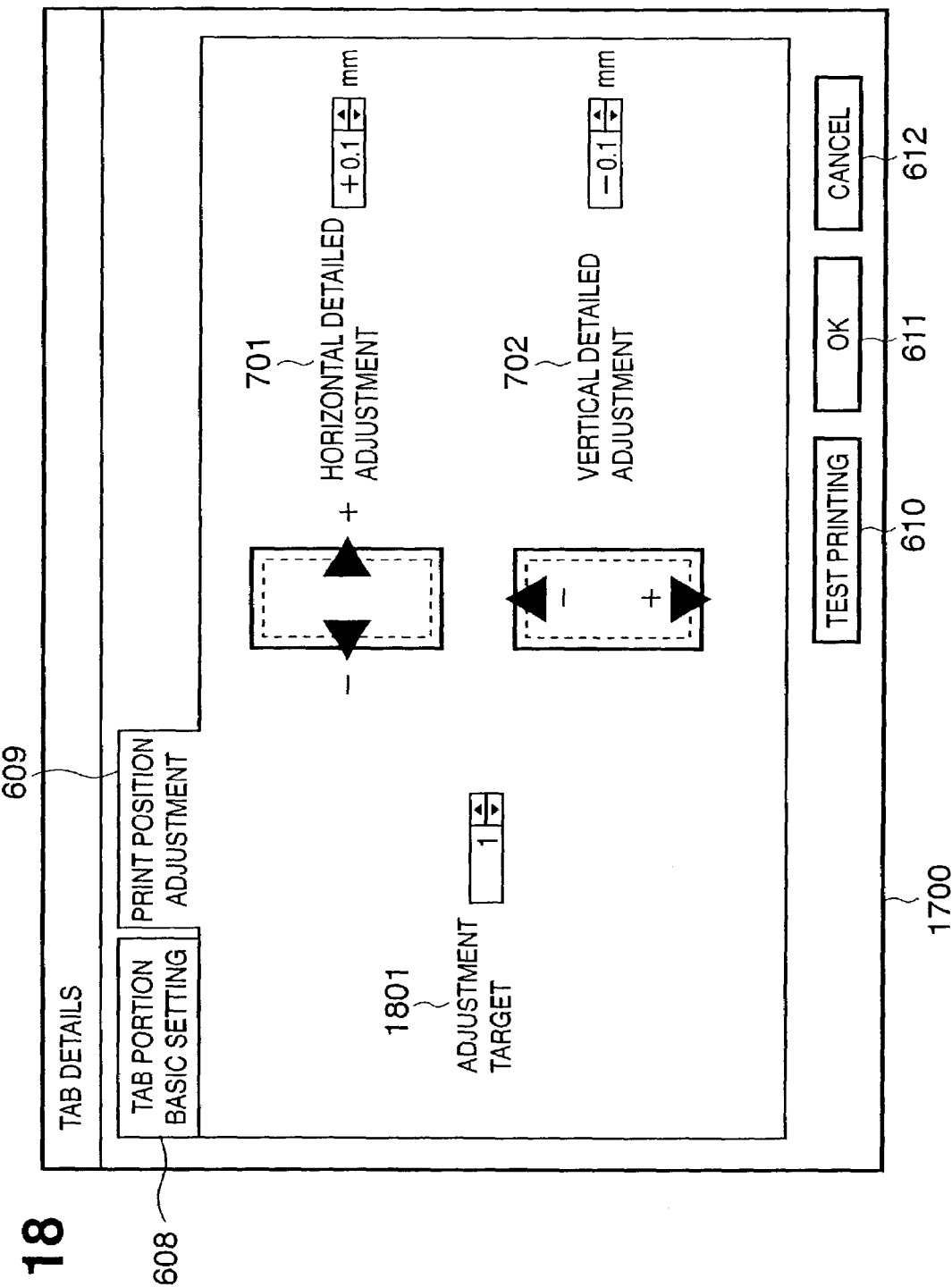
FIG. 18 is a detailed print position adjustment window in which the user inputs detailed adjustment values for the print position of each index information.

[Detailed Adjustment for Print Position of Each Index Information: FIG. 18]

When input operation in a tab portion basic setting window 600 is completed, the user of this system selects "detailed print position adjustment" 609, and the current screen shifts to a detailed print position adjustment window 1700 in FIG. 18.

Referring to FIG. 18, the user more precisely adjusts the print position of each index information, for which basic settings have been made in the tab portion basic setting window 600 in FIG. 6, on the basis of an offset amount ΔL obtained on the basis of the result of test printing on the above test printing sheet. Note that when the user of this system selects "tab portion basic setting" 608 in the detailed print position adjustment window 1700 in FIG. 18, he/she can return to the tab portion basic setting window 600 in FIG. 6.

In the detailed print position adjustment window 1700 in FIG. 18, the user of this system designates the shift amount of the print position of index information in the horizontal direction ("horizontal detailed adjustment" 701) which corresponds to the index area ("adjustment target" 1801) designated from the respective index areas constituting a tab sheet set, and the shift amount of the print position of the index information in the vertical direction ("vertical detailed adjustment" 702).

When an index area as a target for detailed adjustment in the vertical direction/horizontal direction is to be designated by using "adjustment target" 1801, the user can select one of the numbers ranging from 1 (the index area of the uppermost tab sheet) to the number of tab sheets constituting a tab sheet set ("tab sheet count" 601) basically set on the tab portion basic setting window 600. Assume that index areas 2 and 3 are designated following index area 1.

In the case shown in FIG. 18, with "adjustment target" 1801, 1, i.e., the uppermost index area, is designated, and detailed adjustment in the horizontal direction (+0.1) is done for the index area, i.e., the print position of the index information is shifted by 0.1 mm to the right in the horizontal direction.

In the case shown in FIG. 18, with "adjustment target" 1801, 1, i.e., the uppermost index area, is designated, and detailed adjustment in the vertical direction (−0.1) is done for the index area, i.e., the print position of the index information is shifted upward by 0.1 mm in the vertical direction.

In this manner, the tab portion to be subjected to detailed adjustment in the vertical direction/horizontal direction can be changed with "adjustment target" 1801, and detailed print position adjustment for each index area can be done.

When a "test printing" button 610, "OK" button 611, and "cancel" button 612 arranged on the lower end of the user interface shown in FIGS. 6 and 18 are pressed, control is performed to execute test printing, printing on tab sheets, and interruption of tab printing, respectively. The "test printing" button 610, "OK" button 611, and "cancel" button 612 are the same as those described above.

According to this embodiment, in setting the print position of index information with respect to the index area of each tab sheet, offset widths that occur when printing is performed on an actual tab sheet set can be measured from the result of test printing operation of printing all pieces of index information on a single opaque sheet such as plain paper or a single transparent sheet such as an OHP sheet, together with guide lines for eye measurement of print position adjustment amounts, and the print position of each index area can be adjusted on the basis of the eye monochrome value. Therefore, test printing and detailed adjustment processing for the print position of each index information are performed before the index information is printed on an actual tab sheet set. This makes it possible to solve the problem of wasting a tab sheet set due to print offsets. This produces a great effect for tab sheets, in particular, which are expensive compared with plain paper or an OHP sheet.

Fourth Embodiment

Fourth Embodiment

The fourth embodiment will exemplify the method of performing detailed adjustment setting for the print position of index information with respect to one surface (upper surface) in double-sided printing, in addition to detailed adjustment setting for the print position of index information in single-sided printing performed in the first, second, and third embodiments, thereby automatically performing adjustment setting for the print position of index information on the other surface (lower surface).

That is, the method will be described below, in which index information is printed more efficiently by allowing automatic adjustment of a print position with respect to an index area on the lower surface of a tab sheet along with print position adjustment with respect to an index area on the upper surface of a tab sheet.

Note that the arrangement of a printing system according to the fourth embodiment is the same as that of the first embodiment described above except for automatic adjustment of a print position with respect to an index area on the lower surface of a tab sheet. In addition, this system can be used regardless of the type of test printing sheet (opaque or transparent sheet), and hence is identical to the printing system according to the second embodiment described above. Furthermore, since detailed adjustment processing for the print position of each index information can be applied to this printing system, the system is identical to that described in the third embodiment. Since the contents described in the first embodiment with reference to FIGS. 1 to 11, the contents described in the second embodiment with reference to FIGS. 12A to 17B, and the contents described in the third embodiment with reference to FIG. 18 are common to the fourth embodiment to be described below, a description thereof will be omitted. Only the method of automatically adjusting a print position with respect to an index area on the lower surface of a tab sheet, which differs from those in the first to third embodiments, will be described with reference to the flow chart of FIG. 8.

Figure 19A:
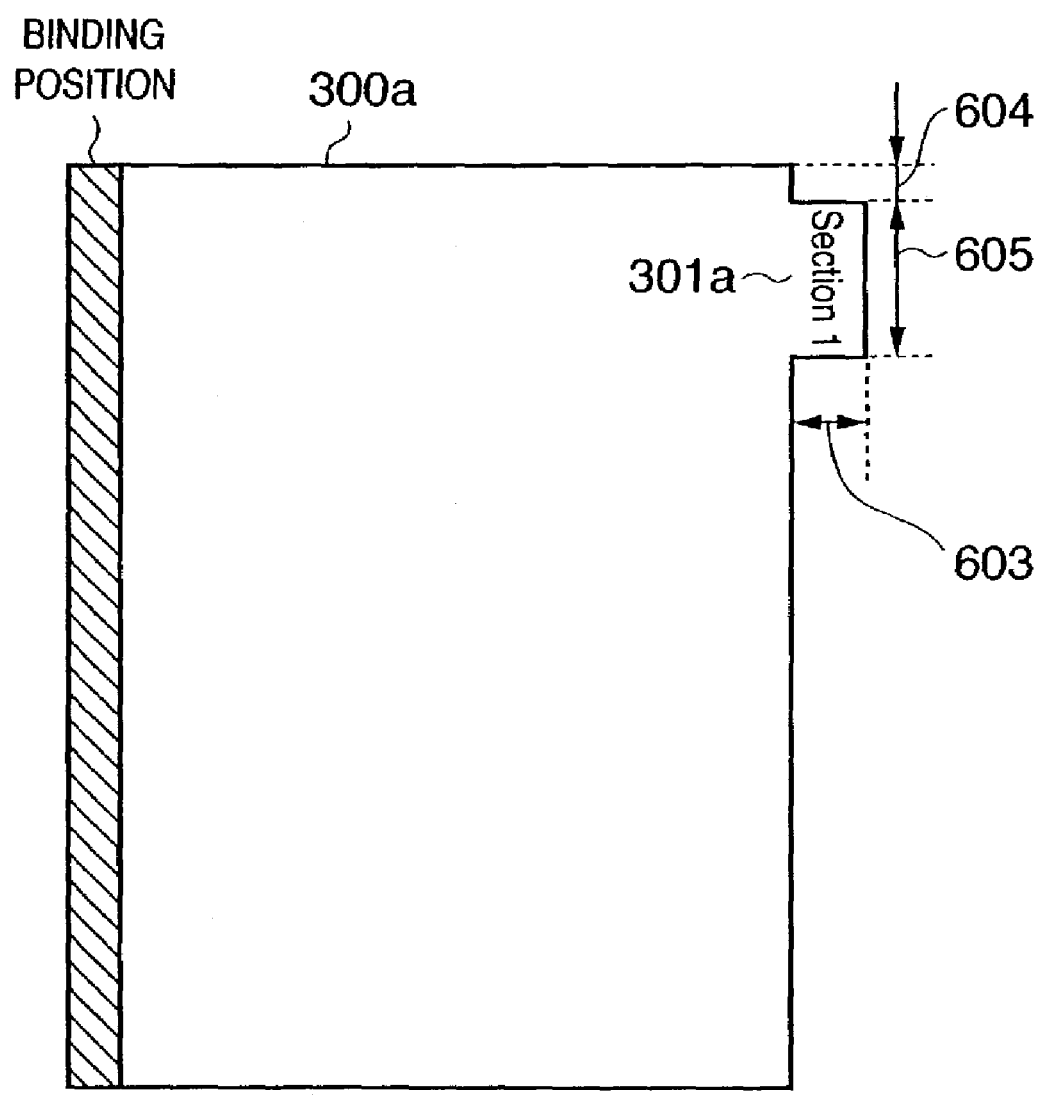
FIG. 19A is a view for explaining automatic adjustment of a print position with respect to the index area on the upper surface of a tab sheet.
Figure 19B:
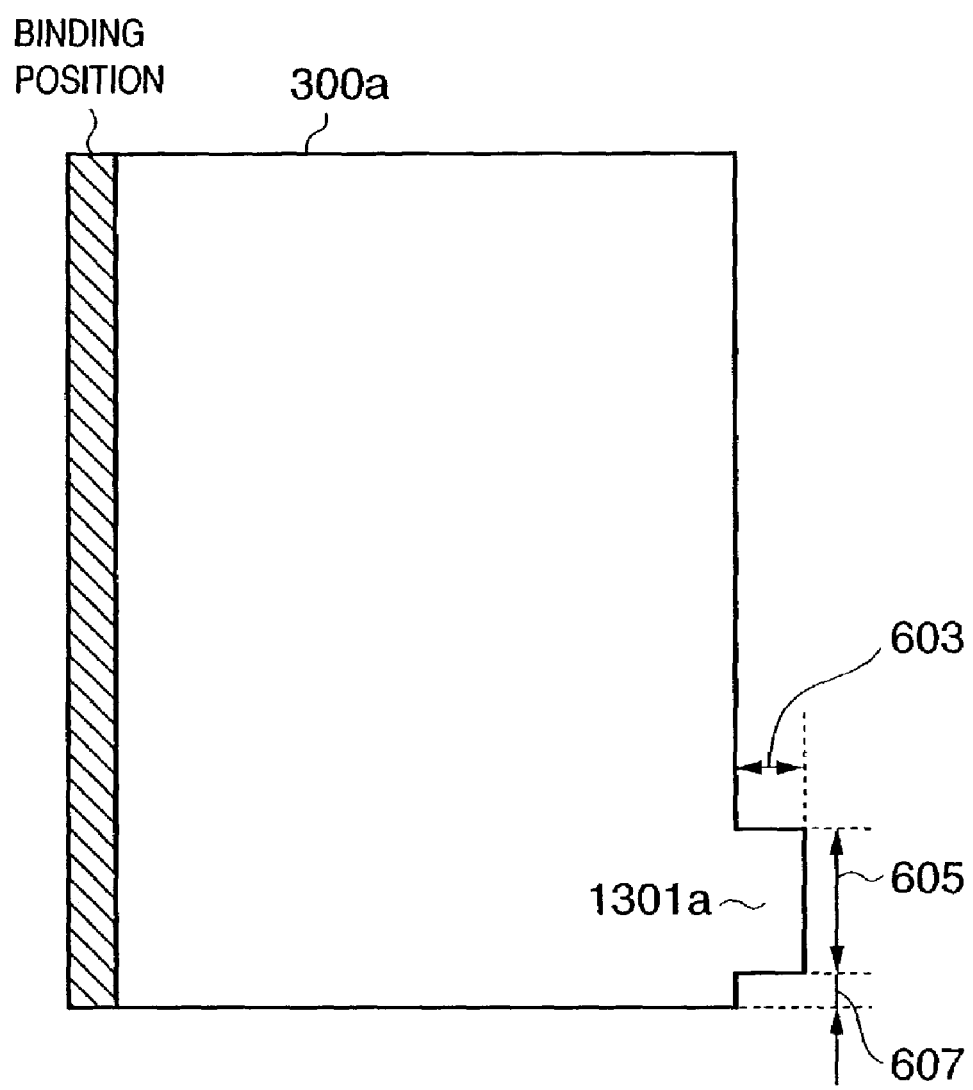
FIG. 19B is a view for explaining automatic adjustment of a print position with respect to the index area on the lower surface of the tab sheet.

[Automatic Adjustment of Print Position with Respect to Index Area on Lower Surface of Tab Sheet: FIGS. 19A and 19B]

FIG. 19A shows an example of the print result output onto a tab sheet 300a in step S808 in FIG. 8. FIG. 19B is a view showing the reverse surface of the tab sheet in FIG. 19A with the binding position being aligned with the left side as in the case shown in FIG. 19A.

As is obvious, since a tab portion 1301a in FIG. 19B is on the reverse side to a tab portion 301a in FIG. 19A, "lower margin" 607 in FIG. 19B is equal to "upper margin" 604 in FIG. 19A. In addition, "height" 605 and "width" 603 of the index area are equal to those in FIG. 19A. That is, this system can be applied to the lower surface of a tab sheet because a print position on the tab portion can be specified concerning an offset value from the upper end of the first tab sheet to the upper end of the index area ("upper margin" 604) and an offset value from the lower end of the last sheet to the lower end of the index area ("lower margin" 607) as well as the width of the index area with respect to the tab sheet ("width" 603), the height of the index area ("height" 605), and the spacing between the respective index areas ("spacing" 606) which are set in step S801 in FIG. 8.

With regard to step S802 in FIG. 8, an adjustment value for the lower surface of the tab sheet can be determined from an adjustment value for the upper surface of the tab sheet as in the conversion method for the above margins ("upper margin" 604 and "lower margin" 607).

More specifically, when the user designates a positive value (e.g., +0.1) with "horizontal detailed adjustment" 701 in FIG. 7, the print positions of index information on both the upper and lower surfaces (two surfaces) of the tab sheet are shifted to the right in the horizontal direction. When the user designates a negative value with "horizontal detailed adjustment" 701, the print positions of index information on both the upper and lower surfaces of the tab sheet are shifted to the left in the horizontal direction.

When the user designates a positive value with "vertical detailed adjustment" 702 in FIG. 7, the print position of the index information on the upper surface of the tab sheet is shifted downward in the vertical direction, and the print position of the index information on the lower surface of the tab sheet is shifted upward in the vertical direction. When the user designates a negative value (e.g., −0.1) with "vertical detailed adjustment" 702, the print position of the index information on the upper surface of the tab sheet is shifted upward in the vertical direction, and the print position of the index information on the lower surface of the tab sheet is shifted downward in the vertical direction.

After detailed adjustment is made with respect to the print positions of the index information in steps S801 and S802 from the test print result obtained in step S805, the user may designate actual tab sheet printing processing with respect to the tab sheet. In this case, when the user presses an "OK" button 611 located at the lower end of the tab portion basic setting window (FIG. 6) or detailed print position adjustment window (FIG. 7), the flow advances to step S806 through step S803.

Alternatively, the user may perform test printing again after making detailed adjustment for the print position of the index information from the test print result in steps S801 and S802.

In this case, the user presses a "test printing" button 610 located at the lower end of the tab portion basic setting window (FIG. 6) or detailed print position adjustment window (FIG. 7). The user may designate actual tab sheet printing processing with respect to a tab sheet set after sufficiently performing detailed adjustment setting for the print position of the index information from the test print result by repeating steps S801, S802, S803, S804, and S805 in this manner. In this case, when the user presses the "OK" button 611 located at the lower end of the tab portion basic setting window (FIG. 6) or detailed print position adjustment window (FIG. 7), the flow advances to step S806 through step S803.

In step S806, if the button pressed in the tab portion basic setting window (FIG. 6) in step S801 or detailed print position adjustment window (FIG. 7) in step S802 is the "OK" button 611, the flow advances to step S807. If this button is the "cancel" button 612, the print position adjustment processing for the index information is terminated.

In step S807, a double-sided printing job for performing index printing on an actual tab sheet set 300 is created on the basis of the setting information of the basic tab sheet settings made in step S801 ("tab sheet count" 601, "opening direction" 602, "width" 603 of each index area, "height" 605 of each index area, "spacing" 606 between index areas, "upper margin" 604, and "lower margin" 607) and detailed print position adjustment settings made in step S802 ("horizontal detailed adjustment" 701 and "vertical detailed adjustment" 702). The flow then advances to step S808.

In step S808, the print position adjustment processing for the index information is terminated after the processing of outputting the index information print job data created in step S807 onto the two surfaces of each sheet of the actual tab sheet set 300.

According to this embodiment, in setting the print position of index information with respect to the index area of each tab sheet, offset widths that occur when printing is performed on an actual tab sheet set can be measured from the result of test printing operation of printing all pieces of index information on a single opaque sheet such as plain paper or a single transparent sheet such as an OHP sheet, together with guide lines for eye measurement of print position adjustment amounts, and the eye measurement values can be reset as each or all of adjustment values for the print position of each index information. In addition, in double-sided printing, resetting of adjustment values on one surface of a tab sheet can be automatically applied to the other surface (lower surface) of the tab sheet. Therefore, test printing and detailed adjustment processing for the print position of each index information can be performed before the index information is printed on the two surface of each sheet of an actual tab sheet set. This makes it possible to solve the problem of wasting a tab sheet set due to print offsets. This produces a great effect for tab sheets, in particular, which are expensive compared with plain paper or an OHP sheet.

Other Embodiment

The present invention may be applied to a system constituted by a plurality of devices (e.g., a host computer, interface device, reader, printer, and the like) or an apparatus comprising a single device (e.g., a copying machine, printer, facsimile apparatus, or the like).

In the above embodiments, the index information of a test has been exemplified. However, the present invention can be applied to print position adjustment of information such as bar code information or image information as long as the information is added to the index position of a tab sheet.

The object of the present invention is realized even by supplying a storage medium storing software program codes for realizing the functions of the above-described embodiments to a printing control apparatus or system, and causing the computer (or a CPU or MPU) of printing control apparatus or the like to read out and execute the program codes stored in the storage medium.

In this case, the program codes read out from the storage medium realize the new functions of the present invention by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU or the like of the function expansion board or function expansion unit performs part or all of actual processing on the basis of the instructions of the program codes.

As has been described above, according to the present invention, when index information is to be printed on the tab portion of each tab sheet, the index information can be accurately printed on a plurality of types of tab sheets, thereby solving the problem of wasting tab sheets due to print errors.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus that controls a printing apparatus capable of printing on tab portions of a plurality of tab sheets, comprising:
   first setting means for setting position information of the tab portions;
   second setting means for setting print positions of index print data to be printed on the tab portions;
   test print data creation means for creating test print data for one page including index information of all tab portions of a plurality of tab sheets and guide lines of all tab portions of a plurality of tab sheets on the basis of the position information of the tab portions that are set by said first setting means and the print positions of the index print data to be printed on the tab portions that are set by said second setting means; and
   test printing means for printing a test printing sheet that consists of one sheet based on the test print data created by said test print data creation means,
   wherein the test printing sheet is used to obtain a print offset amount by comparing with the tab sheets.

2. The apparatus according to claim 1, wherein after the test print data created by said test print data creation means is printed by the printing apparatus, the position information of the tab portions and/or the print positions of the index print data to be printed on the tab portions can be reset by said first setting means and/or said second setting means.

3. The apparatus according to claim 1, wherein said test print data creation means creates print data for printing a print area for the tab portions on the basis of the position information of the tab portions that is set by said first setting means.

4. The apparatus according to claim 1, wherein said second setting means can adjust the print positions of the index print data in a longitudinal direction and widthwise direction of the tab sheet.

5. The apparatus according to claim 4, wherein said second setting means can adjust the print positions of the index print data for each desired tab portion.

6. The apparatus according to claim 1, wherein when double-sided printing on the tab portions is designated, said second setting means sets, on the basis of a print position setting for index print data on one surface of the tab portions, a print position of index print data to be printed on the other surface of the tab portions.

7. The apparatus according to claim 1, wherein the position information of the tab portions that is set by said first setting means includes at least the number of tab sheets and an opening direction.

8. The apparatus according to claim 1, wherein the guide lines created by said test print data creation means are printed so that measurement scale marks for detailed adjustment to measure adjustment amounts for the print position covers areas of all tab portions.

9. A printing control method for a printing apparatus capable of printing on tab portions of a plurality of tab sheets, comprising:

a first setting step of setting position information of the tab portions;

a second setting step of setting print positions of index print data to be printed on the tab portions;

a test print data creation step of creating test print data for one page including index information of all tab portions of a plurality of tab sheets and guide lines of all tab portions of a plurality of tab sheets on the basis of the position information of the tab portions that are set in the first setting step and the print positions of the index print data to be printed on the tab portions that are set in the second setting step; and a test printing step of printing a test printing sheet that consists of one sheet based on the test print data created in said test print data creation step, wherein the test printing sheet is used to obtain a print offset amount by comparing with the tab sheets.

10. The method according to claim 9, wherein in the test print data creation step, print data for printing a print area for the tab portions is created on the basis of the position information of the tab portions that is set in the first setting step.

11. The method according to claim 9, wherein in the second setting step, the print positions of the index print data can be adjusted in a longitudinal direction and widthwise direction of the tab sheet.

12. The method according to claim 11, wherein in the second setting step, the print positions of the index print data can be adjusted for each desired tab portion.

13. The method according to claim 9, wherein when double-sided printing on the tab portions is designated, in the second setting step, on the basis of a print position setting for index print data on one surface of the tab portions, a print position of index print data to be printed on the other surface of the tab portions is set.

14. The method according to claim 9, wherein the position information of the tab portions that is set in the first setting step includes at least the number of tab sheets and an opening direction.

15. The method according to claim 9, wherein after the test print data created in the test print data creation step is printed by the printing apparatus, the position information of the tab portions and/or the print positions of the index print data to be printed on the tab portions can be reset in the first setting step and/or the second setting step.

16. The method according to claim 9, wherein the guide lines created by said test print data creation step are printed so that measurement scale marks for detailed adjustment to measure adjustment amounts for the print position covers areas of all tab portions.

17. A computer-readable medium encoded with a computer program executed by a printing control apparatus that controls a printing apparatus capable of printing on tab portions of a plurality of tab sheets, wherein said computer program comprises:

a first setting step of setting position information of the tab portions;

a second setting step of setting print positions of index print data to be printed on the tab portions;

a test print data creation step of creating test print data for one page including index information of all tab portions of a plurality of tab sheets and guide lines of all tab portions of a plurality of tab sheets on the basis of the position information of the tab portions that are set in the first setting step and the print positions of the index print data to be printed on the tab portions that are set in the second setting step; and a test printing step of printing a test printing sheet that consists of one sheet based on the test print data created in said test print data creation step, wherein the test printing sheet is used to obtain a print offset amount by comparing with the tab sheets.

18. The computer-readable medium encoded with a computer program according to claim 17, wherein in the second setting step, the print positions of the index print data can be adjusted in a longitudinal direction and widthwise direction of the tab sheet.

19. The computer-readable medium encoded with a computer program according to claim 17, wherein in the second setting step, the print positions of the index print data can be adjusted for each desired tab portion.

20. The computer-readable medium encoded with a computer program according to claim 17, wherein when double-sided printing on the tab portions is designated, in the second setting step, on the basis of a print position setting for index print data on one surface of the tab portions, a print position of index print data to be printed on the other surface of the tab portions is set.

21. The computer-readable medium encoded with a computer program according to claim 17, wherein the position information of the tab portions that is set in the first setting step includes at least the number of tab sheets and an opening direction.

22. The computer-readable medium encoded with a computer program according to claim 17, wherein after the test print data created in the test print data creation step is printed by the printing apparatus, the position information of the tab portions and/or the print positions of the index print data to be printed on the tab portions can be reset in the first setting step and/or the second setting step.

23. The computer-readable medium encoded with a computer program according to claim 17, wherein in the test print data creation step, print data for printing a print area for the tab portions is created on the basis of the position information of the tab portions that is set in the first setting step.

24. The computer-readable medium encoded with a computer program according to claim 17, wherein the guide lines created by said test print data creation step are printed so that measurement scale marks for detailed adjustment to measure adjustment amounts for the print position covers areas of all tab portions.

* * * * *